United States Patent
Zhao et al.

(10) Patent No.: US 9,917,756 B2
(45) Date of Patent: Mar. 13, 2018

(54) SYSTEMS AND METHODS FOR VISUALIZING A CALL OVER NETWORK WITH A CALLER READINESS DIALOG BOX

(71) Applicants: Bin Zhao, Shanghai (CN); Jonathan Li, Palo Alto, CA (US)

(72) Inventors: Bin Zhao, Shanghai (CN); Jonathan Li, Palo Alto, CA (US)

(73) Assignee: Agora Lab, Inc., Santa Clara, CA (US)

( * ) Notice: Subject to any disclaimer, the term of this patent is extended or adjusted under 35 U.S.C. 154(b) by 234 days.

(21) Appl. No.: 14/500,968

(22) Filed: Sep. 29, 2014

(65) Prior Publication Data
US 2015/0381816 A1    Dec. 31, 2015

Related U.S. Application Data

(60) Provisional application No. 62/018,520, filed on Jun. 27, 2014, provisional application No. 62/018,522, filed on Jun. 27, 2014.

(51) Int. Cl.
*H04M 3/56* (2006.01)
*H04M 3/432* (2006.01)
(Continued)

(52) U.S. Cl.
CPC ...... *H04L 43/0864* (2013.01); *H04L 12/1827* (2013.01); *H04L 12/1831* (2013.01);
(Continued)

(58) Field of Classification Search
CPC ............. H04L 43/0864; H04L 41/5038; H04L 43/062; H04L 43/50; H04L 45/123;
(Continued)

(56) References Cited

U.S. PATENT DOCUMENTS

| 6,738,357 B1 | 5/2004 | Richter et al. |
| 8,478,819 B1 * | 7/2013 | Kornbluh ............ H04L 12/1818 370/260 |

(Continued)

OTHER PUBLICATIONS

ISA/US, "The International Search Report and Written Opinion", for PCT application No. PCT/US 15/38164, dated Oct. 23, 2015, 7 pages.

(Continued)

*Primary Examiner* — Harry S Hong
(74) *Attorney, Agent, or Firm* — Kang S. Lim

(57) ABSTRACT

Systems and methods for a readiness dialog box for a call over network (CON) are provided. In some embodiments, the readiness dialog box is presented to the callers prior to the onset of the call. It presents the other participant's and their status. For example, it may indicate which participants are online, but not yet ready, those who are ready, and those not available. It also enables the caller to send messages (both preconfigured and customized) to the other participants. Once sufficient participants have joined, the call may start. Sufficiency of participants could include a quorum of individuals, may require that specific participants are ready, everyone is ready, or may be time dependent. The participant requirements may be configured by the individual setting up the call based upon call type.

18 Claims, 23 Drawing Sheets

(51) Int. Cl.

| | |
|---|---|
| *H04L 12/26* | (2006.01) |
| *H04W 4/16* | (2009.01) |
| *H04L 29/06* | (2006.01) |
| *H04L 12/18* | (2006.01) |
| *H04L 12/24* | (2006.01) |
| *H04L 12/721* | (2013.01) |
| *H04L 12/925* | (2013.01) |
| *H04M 3/22* | (2006.01) |
| *H04M 7/00* | (2006.01) |
| *H04L 12/58* | (2006.01) |
| *H04L 12/841* | (2013.01) |
| *H04M 1/253* | (2006.01) |
| *H04M 1/725* | (2006.01) |

(52) U.S. Cl.
CPC ........ *H04L 41/5038* (2013.01); *H04L 43/062* (2013.01); *H04L 43/50* (2013.01); *H04L 45/123* (2013.01); *H04L 47/722* (2013.01); *H04L 65/4038* (2013.01); *H04M 3/2236* (2013.01); *H04M 3/563* (2013.01); *H04M 7/0084* (2013.01); *H04W 4/16* (2013.01); *H04L 47/283* (2013.01); *H04L 51/34* (2013.01); *H04M 1/2535* (2013.01); *H04M 1/72547* (2013.01); *H04M 2250/62* (2013.01); *H04M 2250/74* (2013.01)

(58) Field of Classification Search
CPC .. H04L 47/283; H04L 47/722; H04M 1/2535; H04M 1/72547; H04M 3/2236; H04M 7/0084; H04M 2250/62; H04M 2250/74
See application file for complete search history.

(56) References Cited

U.S. PATENT DOCUMENTS

| | | | |
|---|---|---|---|
| 2002/0131604 | A1 | 9/2002 | Amine |
| 2005/0238156 | A1* | 10/2005 | Turner ................ H04L 12/1818 379/202.01 |
| 2005/0261860 | A1 | 11/2005 | Lobig |
| 2006/0271369 | A1 | 11/2006 | Poirier |
| 2008/0037751 | A1* | 2/2008 | Aldrey .............. H04M 3/42161 379/202.01 |
| 2008/0084984 | A1* | 4/2008 | Levy .................. H04L 12/1818 379/202.01 |
| 2009/0110169 | A1* | 4/2009 | Whitsell ............. H04L 12/1818 379/205.01 |
| 2011/0205915 | A1 | 8/2011 | Skrabutenas et al. |
| 2011/0235541 | A1 | 9/2011 | Choudhury et al. |
| 2012/0140909 | A1 | 6/2012 | Johnson, Jr. et al. |
| 2014/0044246 | A1 | 2/2014 | Klemm et al. |

OTHER PUBLICATIONS

ISA/US, "The International Search Report and Written Opinion", for PCT application No. PCT/US 15/38163, dated Dec. 30, 2015, 14 pages.

* cited by examiner

SYSTEMS AND METHODS FOR VISUALIZING A CALL OVER NETWORK WITH A CALLER READINESS DIALOG BOX

CROSS REFERENCE TO RELATED APPLICATIONS

This application claims the benefit of and is a continuation-in-part of co-pending U.S. provisional application No. 62/018,520 filed Jun. 27, 2014 by Bin Zhao et al. entitled "Systems and Methods for Visualizing a Call Over Network", which application is incorporated in its entirety by this reference.

This application also claims the benefit of and is a continuation-in-part of co-pending U.S. provisional application No. 62/018,522 filed Jun. 27, 2014 by Bin Zhao et al. entitled "Systems and Methods for Improved Quality of a Visualized Call Over Network", which is incorporated herein in its entirety by this reference.

Further, this application is related to co-pending U.S. application Ser. No. 14/500,954, filed Sep. 29, 2014, entitled "Systems and Methods for Visualizing a Call Over Network", by Bin Zhao et al., which is incorporated herein in its entirety by this reference.

Also, this application is related to co-pending U.S. application Ser. No. 14/500,960, filed Sep. 29, 2014, entitled "Systems and Methods for Improved Quality of a Visualized Call Over Network Through Pathway Testing", by Bin Zhao et al., which is incorporated herein in its entirety by this reference.

Additionally, this application is related to co-pending U.S. application Ser. No. 14/500,984, filed Sep. 29, 2014, entitled "Systems and Methods for a Call Over Network with a Visualized Summary", by Bin Zhao et al., which is incorporated herein in its entirety by this reference.

Lastly, this application is related to co-pending U.S. application Ser. No. 14/500,998, filed Sep. 29, 2014, entitled "Systems and Methods for Improved Quality of a Visualized Call Over Network Through Scenario Based Buffer Modulation", by Bin Zhao et al., which is incorporated herein in its entirety by this reference.

BACKGROUND

This invention relates generally to systems and methods for visualization of a call over network. Such systems and methods enable more efficient communications over networks than is currently available. This results in faster and more productive calls.

Currently, a number of platforms are available for call over network (CON) communications. These typically include audio and/or video calling capabilities that rely upon the internet (or other suitable network) in order to enable communications between two or more participants. Examples of current CON systems include Vonage, Skype, WebEx, and Facetime, for example. Each of these systems have some differentiating features, but predominantly operate via scheduling or otherwise initiating a call, and then transmitting and receiving audio and/or video material. In some of the more sophisticated CON systems, such as WebEx, participants additionally have the capability to share their computer desktop, and further pass this functionality to other participants.

While these CON systems have done a lot to enhance causal communications, the larger impact of CON systems is arguably on in relation to how businesses operate. Traditionally, in-face meetings were required to fully engage other business partners. The conference call was available, but often didn't provide sufficient context to be an efficient form of communication. These newer CON systems have further increased how easily remote participants can communicate effectively; however, there are still a number of problems that tend to plague existing CON systems.

For example, proper connectivity of all users in a CON system is routinely an issue. Often one participant can have trouble joining or hearing without the other participant's knowledge. Further disambiguation of the various speakers is also often problematic, especially as the number of participants grows. And lastly, as mentioned above, these existing systems still lack much of the context that an in-person meeting provides, which further makes proper understanding of what is being communicated difficult.

Further, one of the largest problems facing CON systems is the fact that data is typically transmitted via the internet, which is a "best effort network". Best effort network means that the data is transmitted with the best timing and quality reasonably possible. However, the data is transmitted over often torturous pathways, in sub-optimal conditions. As such, often timing and/or quality of the transmitted data are negatively impacted.

Traditional call over network systems handle this reduction in call quality and/or timing by reducing high data demanding communications. For example, in Skype, the video portion of the call may have a reduced quality, or may be halted altogether. Additionally, these existing systems simply drop the call if the timing and/or quality gets below a threshold. The thinking behind these dropped calls is that the inconvenience of not being able to communicate is less burdensome that a bad connection.

While there is some merit to this business model, there are some circumstances where communication is required, even in sub-optimal network conditions. This can be especially true where a number of participants are engaging in a conference call. Here schedules are often difficult to coordinate, and as such the need to communicate via that medium, and at that time, are magnified.

All of these drawbacks to existing CON systems requires that callers repeat information more often, and reduces efficiency for all members. Moreover, in the extreme situation of a badly compromised network connection, existing CON systems are rendered inoperable. Impatient participants that have a good connection may quickly lose interest in the conversation as the pace seems unbearably slow, or as the calls are dropped. Other participants may leave the call missing much of what has been communicated. Often these participants don't want to ask for clarification too often due to respect for the numerous other participants' time. In the case of dropped calls, important communication may simply never happen.

It is therefore apparent that an urgent need exists for systems and methods for visualization of a call over network that provides tools and interfaces that increase participant understanding and call fidelity, and thereby enhances efficiency of these communications. Such systems and methods provide participants the ability to better coordinate and initiate calls, better visualization of the other participants' status and actions within the call, and enhances the ability for calls to deal with extremely poor network situations. Further embodiments also enable a host of tools and analytics that allow the participant to visualize during the call, and after the call's conclusion, a range of contextually meaningful information to further enhance the clarity of what is being communicated.

SUMMARY

To achieve the foregoing and in accordance with the present invention, systems and methods for visualizing a call over a network with a caller readiness dialog box is provided. Such systems and methods enable enhanced call conferencing capabilities which eliminate or reduce a number of the problems that currently plague traditional call conferencing platforms. This results in better understanding among the various participants of the call, as well as enhanced summarization and sharing of the visualized call.

The readiness dialog box is presented to the callers prior to the onset of the call. It presents the other participant's and their status. For example, it may indicate which participants are online, but not yet ready, those who are ready, and those not available. It also enables the caller to send messages (both preconfigured and customized) to the other participants. Once sufficient participants have joined, the call may start.

Sufficiency of participants could include a quorum of individuals, may require that specific participants are ready, everyone is ready, or may be time dependent. The participant requirements may be configured by the individual setting up the call based upon call type.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
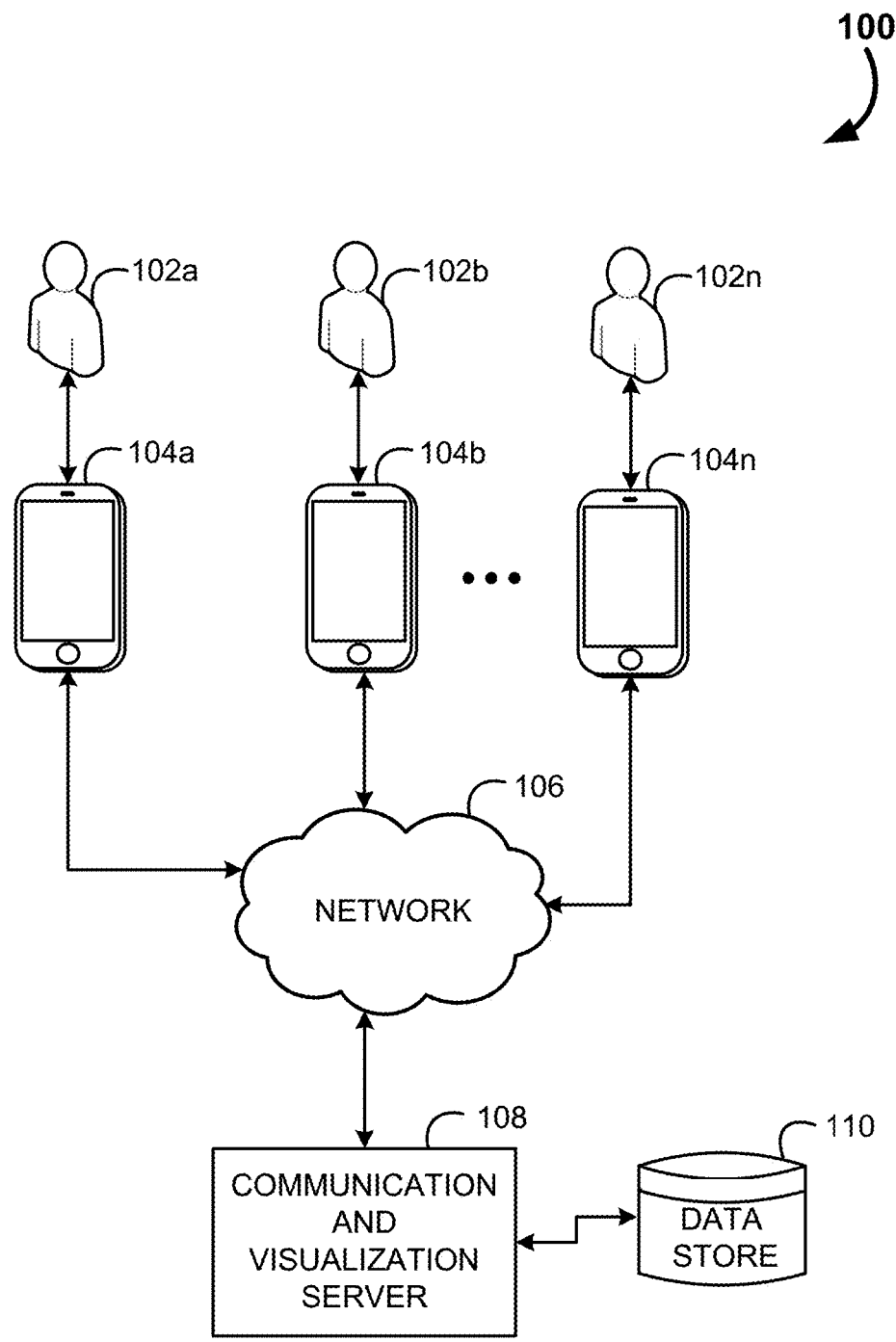
FIG. 1 is an example schematic block diagram for a system for visualizing a call over network, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after,"

"lastly," and "finally," are not meant to limit the scope of the present invention as the embodiments disclosed herein are merely exemplary.

The following discussion relates to methods and systems for visualizing a call over network (CON). Such systems and methods enable enhanced call conferencing capabilities which eliminate or reduce a number of the problems that currently plague traditional call conferencing platforms. This results in better understanding among the various participants of the call, as well as enhanced summarization and sharing of the visualized call. Additionally, such systems are enabled to better handle poor network conditions that would cause current CON systems to cease operation.

As previously noted, a number of current CON systems are available. Each of these systems has some benefits compared against one another, but all of them fail to provide the call functionality and unprecedented call visualization capabilities that the present systems and methods provide. Additionally, these existing systems fail to handle poor network connectivity, resulting in dropped calls.

For the sake of clarity, the presently disclosed visualization functions will be described as an integrated CON standalone system. However, despite this portrayal of the CON system with visualization, it is also considered within the scope of this disclosure that the functionalities disclosed herein could in incorporated into an add-on module, capable of overlaying existing CON architectures. In such a way, callers could continue to rely upon Skype, for example, due to brand loyalty and robust back end servers, and yet still enjoy the added visualization disclosed herein. As such, an overlay application for an existing CON system, or a fully integrated CON system are considered equally covered by the present disclosure.

The term "device" as used herein is intended to refer to any device to which a participant may communicate with via the CON with visualization. Often these devices are also referred to as "mobile devices" as one focus of such communication is with devices such as laptops, cell phones, and tablets. However, it should be understood that any device where communication is desired falls within the scope of the term "device".

Also note that the term "participant" is utilized to describe the user of a device who is engaging in a call. It is likewise understood that the terms "user", "caller", and "member" are likewise often utilized interchangeably with the term "participant".

Moreover, while the term "call" is utilized, and often referred to in relation to audio communication, the term "call" is intended to be broad enough to encompass any audio and/or video communication. Thus, for the sake of clarity, many of the examples will center on audio only conference type calling, but video calls, or calls whereby digital material or desktop screenshots are shared, are equally intended to be within the scope of the term "call".

Note that the following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

I. Visualization of Call Over Network

To facilitate this discussion, FIG. 1 provides an example schematic block diagram for a system for visualizing a call over network, shown generally at 100. In this example block diagram, a number of participants 102*a-n* are illustrated engaging a plurality of devices 104*a-n*. Note that for a successful call only two devices, and a minimum of two participants 102*a-n*, are required. However, as will be elucidated below in conjunction with examples and embodiments, call visualization really shines when there is a plurality of participants 102*a-n* and/or devices 104*a-n*.

Note that while a one to one ratio of participant to device is illustrated, for the sake of simplicity, it is entirely within the scope of this disclosure that there may be multiple participants 102*a-n* on any one device if they are concurrently located.

As previously noted, devices 104*a-n* may refer to any number of device types, not only cell phones as illustrated herein. In some embodiments, the systems and methods disclosed herein may be particularly formatted in order to operate on such mobile devices, since call quality and ability to understand may be most heavily compromised on such mobile devices; however, in alternate embodiments the systems and methods of call visualization disclosed herein are equally able to be implemented on a wide array of devices (i.e., laptop and desktop computers, game consoles, dedicated teleconferencing equipment, etc.).

The devices 104*a-n* couple to a communication and visualization server 108 via a network 106. The network 106 most typically includes the internet, but may also include other networks such as a corporate WAN, cellular network, or combination thereof, for example. The server 108 mediates communication traffic between the various devices 104*a-n*. The server 108 may access a data store 110 for device/participant credentials, to store call data or other data of interest (metadata for example).

As previously disclosed, one of the largest problems facing CON systems is the fact that data is typically transmitted via the internet, which is a "best effort network". Best effort network means that the data is transmitted with the best timing and quality reasonably possible. As such, the timing and/or quality of the data received are typically compromised. In the circumstances where the network is entirely broken, backup channel(s) may be employed in order to ensure that the call is still operable.

Typically, data transferred over the internet can be repaired as retransmissions are received, or as late packets are re-integrated. However, in the context of human discussions, waiting for late packets, or packet retransmission, is often undesirable due to the latency caused in the speech. People naturally wait a very short time after they finish speaking before they become impatient and expect some kind of response. The period of time varies by individual, and by culture; however, typically 200-800 ms delay between the end of a speaker talking, and a response causes the speaker to wonder if they were heard. If there is a response delay of longer than 200-800 ms, the speaker will often repeat information, or query the other participants' whether they heard what was spoken. This makes sense in face to face communication, but in circumstances where there are network delays, this repetition often causes speakers to talk over one another, or otherwise miscommunicate.

As such, current call over network systems typically limit the length of a network delay. By limiting delay, the number of late packets that can be successfully re-integrated is likewise limited, thereby reducing quality of the call. In poor network conditions that may cause the call quality to fall below an acceptable threshold. These existing CON systems respond by dropping the call.

Dropped calls are obviously very problematic for the callers; especially when there are a number of callers involved. The ability to reduce dropped calls, and still operate under sub-optimal network conditions, is a major advantage provided by the currently disclosed systems and methods.

The current system handles poor quality networks by a sophisticated combination of network pathway testing (to ensure the best pathways are utilized), and variable delay buffers that operate based upon call scenario, and balancing quality and timing needs.

The details of the delayed buffer, and closed loop pathway testing are provided in considerable detail in relation to co-pending U.S. application Ser. No. 62/018,522, which is hereby incorporated herein by reference.

While a variable delay buffer can enable call operability in very low quality networks, it requires additional visualization features in order to avoid speaker confusion. These visualization features will be described in greater detail below.

Figure 2:
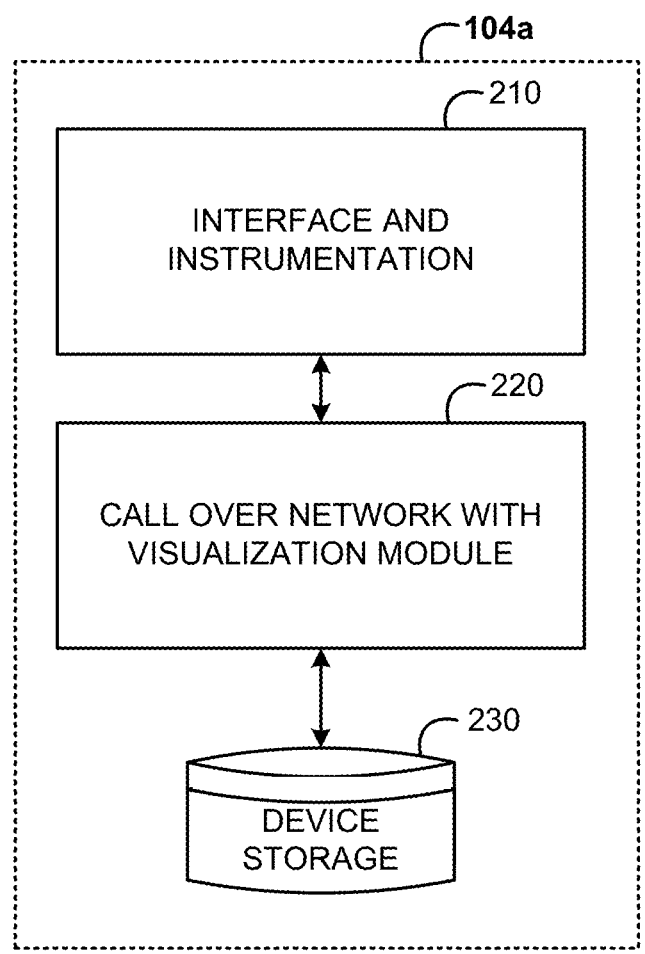
FIG. 2 is an example schematic block diagram for a communication device used in conjunction with visualizing a call over network, in accordance with some embodiments.

Much of the call visualization requires interplay between the devices 104a-n and the associated software stored thereon, and the server 108 which is able to parse out and transmit information between devices 104a-n. FIG. 2 is an example schematic block diagram for one such communication device 104a used in conjunction with visualizing a call over network 100. This illustration the device is seen as including at least one interface and the instrumentation 210 required to effectuate the visualized call. At a minimum this includes one or more displays, speaker, microphone, and input devices (touch screen, keyboard, etc.). The device 104a also requires a means to transmit data to and from the network 106. This may include a Wi-Fi connection, cellular connection, or other connection type as is appropriate for the present device 104a.

In addition, it may be desirous to have additional functionality that required specialized instrumentation, such as GPS, vibration, biometric collectors, temperature sensors, etc. The specific functionalities that may employ such specialized instrumentation will be explored in greater detail below.

The instrumentation and interface 210 couples, physically or logically, with a call over network with visualization module 220, which typically includes computer readable instructions on non-volatile device storage 230, and executed via one or more processors.

Figure 3:
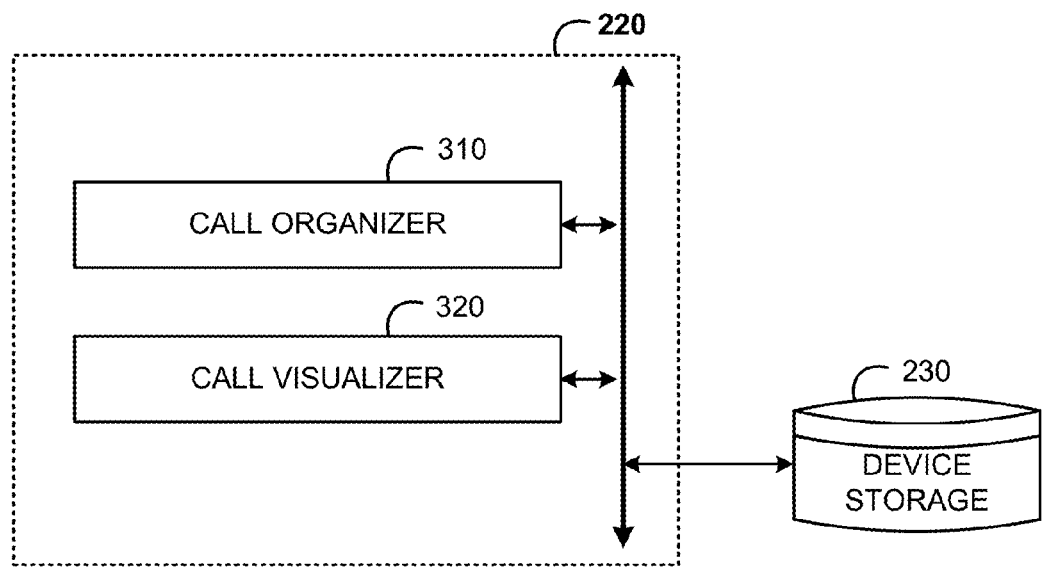
FIG. 3 is an example schematic block diagram for more detailed view of the visualization module of the communication device, in accordance with some embodiments.

FIG. 3 is an example schematic block diagram for a more detailed view of the visualization module 220 of the communication device 104a. The visualization module consists of two primary components: a call organizer 310 and a call visualizer 320. The call organizer 310 is responsible for the scheduling and initiation of a call. The call organizer 310 is described in greater detail below.

In contrast, the call visualizer 320 is responsible for the actual visualization features during the call, and, in some embodiments, is capable of producing highly visualized summaries of the completed calls. Like the call organizer 310, the call visualizer 320 will be described in considerable detail below.

The call organizer 310 and call visualizer 320 are capable of accessing the device storage 230. The call organizer 310 may access calendar information stored on the device for the participant in order to assist in call scheduling. Likewise, scheduled calls may be stored in the device storage 320 for reminder when the date and time of the call draws near. Likewise auto calendar population with scheduled calls may be enabled, in some embodiments. Likewise, the call visualizer 320 may utilize the device storage 320 for storing of call summaries and for contact information, for example.

Figure 4:
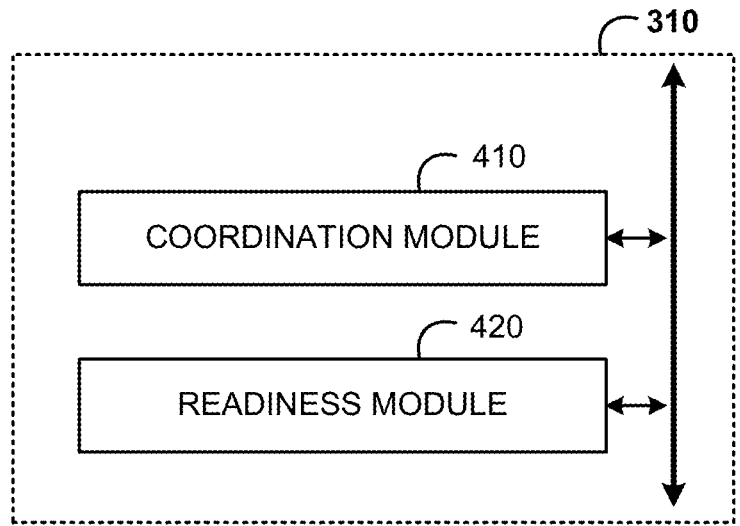
FIG. 4 is an example schematic block diagram for more detailed view of the call organizer of the communication device, in accordance with some embodiments.

Moving on, FIG. 4 is an example schematic block diagram for more detailed view of the call organizer 310. As previously mentioned, the call organizer provides two functions: the scheduling of calls by the call coordination module 410, and the initiation of calls by the readiness module 420. While a call may be initiated on the fly, more often large conference calls require early scheduling in order to ensure availability of the parties. The coordination module 410 is the component responsible for ensuring that the required data is available to properly schedule the call. This includes querying participants' calendars in order to suggest times which minimize conflicts. The coordination module 410 may then save the scheduled call on the device calendar (or synchronize with some other scheduler). Additionally, in some cases the coordinator may generate reminder instant messages, emails, push notifications, or the like to remind the participant 102a of the scheduled call.

The call readiness module 420 becomes more prominent as the call draws close in time, and enables participant 102a interaction pre-call to ensure that confusion over the call is minimized. Currently, a call typically starts at the allocated time, and the next five to fifteen minutes are spent doing nothing productive as the participants' attempt to contact missing members, make sure everyone can hear properly, etc. This can be a major drain on time, and can unnecessarily extend a conference call.

Figure 5:
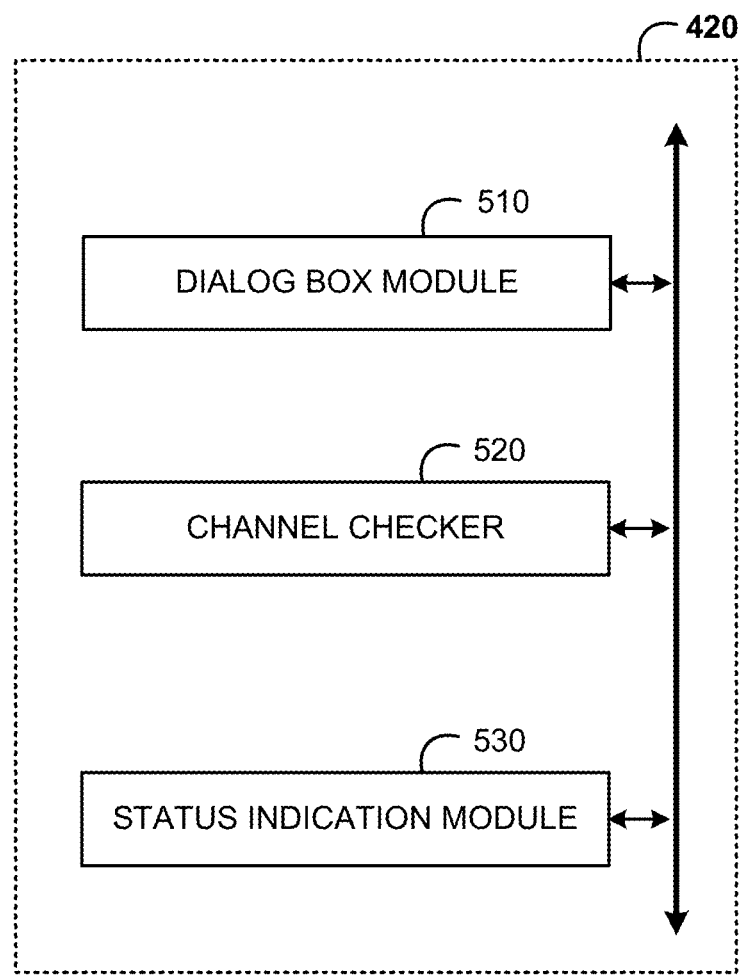
FIG. 5 is an example schematic block diagram for more detailed view of the readiness module of the communication device, in accordance with some embodiments.

FIG. 5 is an example schematic block diagram for more detailed view of the readiness module 420, which illustrates how the readiness module 420 can increase participant efficiency. The readiness module's 420 primary mechanism to ensure proper call start time is to delay the call initiation until the required participants are present. This is accomplished by enabling a dialog box, via the dialog box module 510, that promotes open communication between the participants as they become available. In this manner people are not left guessing if additional members are to join, or the timing of everyone's readiness. The dialog box may, in some embodiments, be populated by quickly selected messages, or via a custom message. For example, if the user is in a meeting that is taking longer than originally planned, the user may wish to discretely select a message stating "Be there in 15 minutes" in order to not disturb others. Alternatively, a participant may wish to provide a more detailed message that more effectively communicates their status, such as "Running late, start without me and I'll catch up."

In addition to the readiness of the actual participants 102a, the call readiness module 420 has the capability to query microphone and speaker channels, via the channel checker 520, to ensure the device is in fact ready to perform as desired. This is important, because often under traditional conferencing systems, these issues are not recognized until after the call has started. This results in yet further delays and wasted participant time when these channel issues could have been addressed before the call even started.

Lastly, a status indication module 530 may provide the participant an indication of the status of the device, other participant's 102a-n readiness, and the device 104a-n readiness of the other participants' 102a-n. In some cases, during call scheduling, essential participants 102a-n may be indicated by the call organizer. This enables the call to start once all essential participants' are ready (referred to herein as a quorum). Often all members to a call are not needed, but a core group is required otherwise the purpose of the call is moot. This feature enables calls to start in a manner that minimizes the waste on each participant's respective time.

Figure 6:
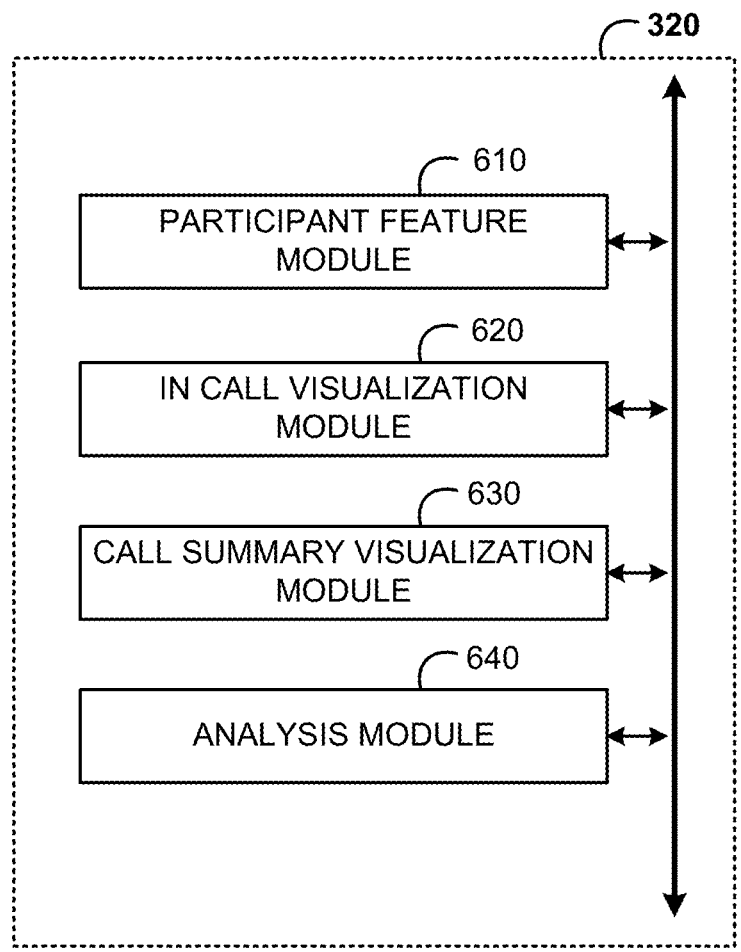
FIG. 6 is an example schematic block diagram for more detailed view of the call visualizer of the communication device, in accordance with some embodiments.

After the call has been initiated, the call visualizer 320 provides visualization functionality during the call's progression, and for the summary of the call. FIG. 6 is an example schematic block diagram for more detailed view of the call visualizer 320. The first major advantage provided by the visualizer 320 is the enablement of far more participant features during the call, via a participant feature module.

The visualizer 320 then enables in call visualization of who is speaking, and their interactions via an in call visualization module 620. After the call is concluded, a call summary visualization module 630 may compile the call information in a manner that enables better participant understanding and call clarity. Summarization may be aided through the usage of analytics performed by an analysis module 640.

The specifics of each of these modules will be explored in further detail below, and will illustrate how call visualization enabled more efficient calls with better understanding among the participants 102*a-n*. As previously noted, while current conference calling means are adequate under many circumstances, they often lead to significant reductions in productivity due to miscommunication and delays. In the business world this translates directly into the bottom line.

Figure 7:
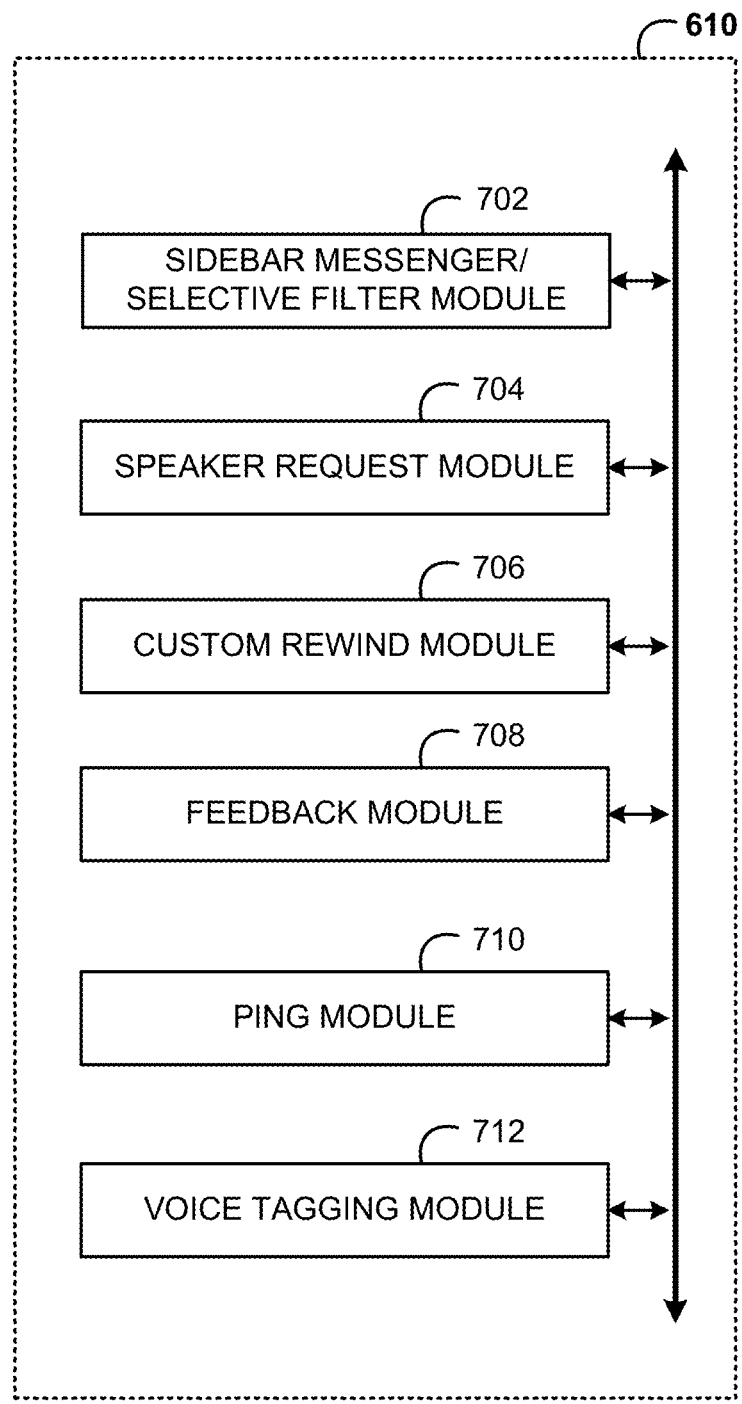
FIG. 7 is an example schematic block diagram for more detailed view of the participant feature module of the communication device, in accordance with some embodiments.

Moving on, FIG. 7 is an example schematic block diagram for more detailed view of the participant feature module 610. Examples of features included within the participant feature module 610 include a sidebar messenger 702, speaker request 704, custom rewind 706, feedback 708, ping capability 710, and voice tagging 712, in any combination and in conjunction with any other known feature set. These participant functions generate a more immersive, and data rich, call experience that enables better visualization and call efficiency.

The sidebar messenger module 702 leverages off of current text messaging functionality already present in a number of CON systems. Current messaging capabilities typically send out a typed message to the entire group, or in more advanced systems, to a specific individual. The currently disclosed sidebar module 702 goes a step further and enables the participant to send a message to any subset of the total participants. This may be of particular use where a message should go to multiple members, but not others (in remote negotiations for example). Further, in some embodiments, this feature is not limited to text messaging, but may also include filtering audio to only the intended recipients. Thus, a participant may select as many members as he would like to communicate with, and make sure only those members hear the audio being spoken. This may likewise be useful when a participant wants to quickly ask a question for clarification without disrupting the bulk of the participants' conversation.

The speaker request module 704 enables the participants to select an indicator that tells the other participants that they wish to talk. Often, with multiple parties on a call, speakers overlap as they try to speak. Sometimes the speakers don't even realize they are speaking over one another, and the resulting audio is incomprehensible to the other participants. By providing an indicator that shows all members someone wishes to speak, participants are spared the need to break into another person's conversation in order to be heard.

The custom rewind module 706, is one of the largest time-saving features to the presently disclosed systems and methods. Due to network bandwidth fluctuations, temporary interferences, or simply lost or late packets, calls over network are inherently of poorer quality than ideal (i.e., a best effort network). Moreover, even when the audio and/or video data is flawless, people sometimes misunderstand what is being stated for a whole host of reasons. This is currently resolved by a participant merely missing out on some information (which reduces call effectiveness), or requires clarification by the participant (which wastes time thereby reducing call efficiency). Rather than requiring constant clarification, the presently disclosed functionality enables the participant to rewind the live call a configurable amount of time and re-experience the unclear portion of the call.

A significant portion of the time, re-experiencing a few seconds of the conversation can clarify what would ordinarily require a full disruption of the call. In some embodiments, the re-played portion may be sped-up (for example 150%) in order to catch the participant up to real time conversation quickly. This ensures that the participant does not get left out of interacting with the conversation for long. The audio playback during this sped-up replay may be frequency modulated to ensure the audio has as normal a sound as possible (i.e., avoiding the "squeaky voice" that sped-up audio is known for). Alternatively, the replayed portion of the call may be layered over the current call discussions in a "whisper mode" whereby the replay is reduced in volume, and optionally modulated in pitch, in order to mimic a person whispering the missed portion of the conversation. Most people are capable of following two conversations at once if they are so presented, and this enables the participant to remain part of the conversation while still re-experiencing call segments.

Further, while a few seconds does not sound like much time to the human perceiving the call, this time enables late packets of information to be re-integrated into the replay. Thus, the rewound play-back may be of superior quality as compared to the original experience. This too reduces confusion, and greatly increases call efficiency.

The feedback module 708 enables the participants to include feedback that can be visually displayed to other members. In the simplest of forms this could merely be a "thumbs-up" or "thumbs-down" designation to indicate agreement, or not, with what is being discussed. However, it can easily be seen that such non-verbal feedback could include a whole host of voting selections, mood indicators, or the like.

The ping module 710 enables a participant to send a ping to one or more other participants. Where the participant's devices have vibration ability (as with most phones), the ping could include a short vibration sent to the other participant. Likewise, the ping could include an isolated audio alert, or a visual alert (for example the pinging participant's icon could flash on the pinged participant's display).

Lastly, the voice tagging module 712 enables the participant to tag a voice against a contact list. In future conversations the voice may be recognized, and likewise tagged automatically.

Figure 8:
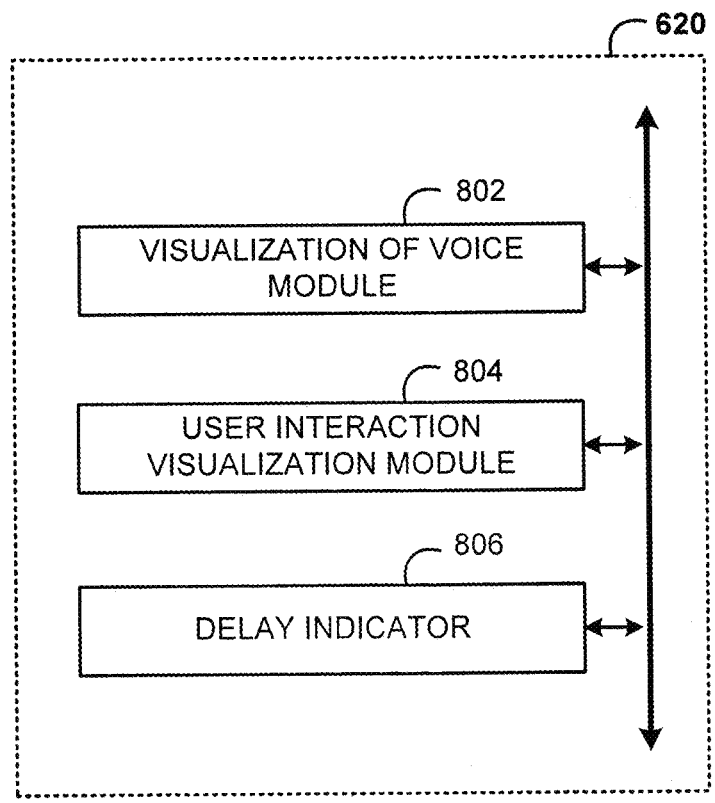
FIG. 8 is an example schematic block diagram for more detailed view of the in call visualization module of the communication device, in accordance with some embodiments.

Now that the call features have been described in greater detail, attention will be turned to FIG. 8 which provides an example schematic block diagram for a more detailed view of the in call visualization module 620. The call visualization module 620 is the heart of the visualization process of the call over network. It includes three key parts, the visualization of voice 802, participant interaction visualization 804, and a delay indicator 806.

The voice visualization module 802 is a novel way of displaying who is speaking in a chronological order. This may be displayed in a single channel, or as multiple channels. The benefit of displaying the audio in this manner is that the participant can easily follow the flow of the conversation between users.

The interaction visualization module 804 enables the display of other participant's actions (such as using the speaker request or feedback functionalities discussed previously). Since the audio data is displayed chronologically, these user interactions may be displayed in context to the conversation in which they are being employed. This provides the participant with a far more complete understanding of all other callers' thoughts and perceptions of a given topic. A series of examples will be explored below to provide clarity to the visualization process.

The delay indicator 806 works in conjunction with the variable delay buffer, to ensure that user's experience of the call does not overly suffer when a longer than optimal delay is introduced. Although the variable delay buffer is disclosed in greater detail in relation to co-pending U.S. application Ser. No. 62/018,522 , the basic premise is that the call may be delayed by a variable amount of time based upon a number of factors, including quality of the data, scenario of the conversation, and timing of the playback.

Clearly in an optimal network situation, delays are minimized because the data quality is excellent. However, in more challenging network environments, initially a lower bit rate codec may be employed. If this is insufficient to resolve the problems caused by the poor network, then the delay may be increased in order to ensure that late or retransmitted packets can be received and reintegrated into the call. Thus, there becomes a balancing act between acceptable delays, and acceptable call quality. This balancing act may be weighted differently based upon call type. For example, if a caller is lecturing, a longer delay is acceptable (favoring increased call quality). In contrast, if the call involves rapid changes in who is speaking, as is typical in a discussion, then a shorter delay may be needed (at the expense of quality).

However, in some situations, network connectivity may be so bad that even meeting basic call quality levels requires significant delays. For example, in very poor network conditions delays up to a number of seconds may be required. Current call over network systems merely drop the call in such situations. However the current systems and methods include a delay indicator 806 which enables us workable means to have such delays without the common issues associated with them (impatient speakers, speakers talking over one another, etc.)

When delays are moderate, say less than 800 ms for example, the system may operate without a delay indication, as most users are comfortable with such a delay and impatience won't become an issue. However, in order to accommodate longer delays, the delay indicator 806 introduces an indication after the speaker is done talking that a delay is present. Often this delay indication includes a replay of the audio portion synched to the timing the other participants' are hearing it. In other embodiments, this replay may be offset by a configurable time in order to minimize the perception of the delay, and leverage a person's natural tendency to wait for a response.

For example, assume there is a very poor network connectivity that requires a 2 second delay in the audio in order to have sufficient quality. After speaker A finishes his sentence, the last few words of what was spoken may be repeated to speaker A to make him aware that the communication is being delayed to the other participants'. As most people are comfortable with up to an 800 ms pause between speaking, in this example the last 1.2 seconds (2 seconds-800 ms) of speaker A's audio may be replayed back to him. In this way, speaker A is aware his audio has been delayed, and he will avoid speaking over another caller, or otherwise become impatient due to a lack of an immediate response.

Of course alternate means of indicating a delay are also possible. For example, in some embodiments, a visual indicating may be provided illustrating that the other participants' are still receiving the audio. Alternatively, both a visual and audio indication may be utilized.

Figure 9:
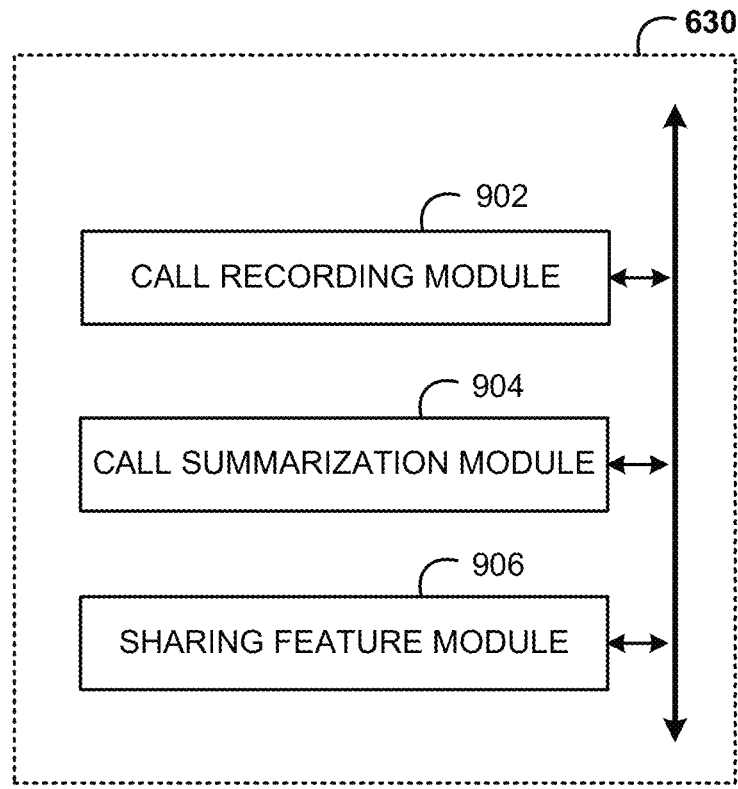
FIG. 9 is an example schematic block diagram for more detailed view of the call summary visualization module of the communication device, in accordance with some embodiments.

FIG. 9 is an example schematic block diagram for more detailed view of the call summary visualization module 630. This module includes call recording 902, visual summarization 904, and sharing 906. At the root of the call summary is the actual recording of the conversation. In some cases, late packets can be re-integrated into the recording to ensure higher fidelity. The recording can be appended by any number of analyses in order to generate a summarization. Also, as in the above disclosed visualization, the call summary may likewise include a chronological visual summary of the call.

Lastly, the summary can be conveniently exported to contacts, or otherwise emailed, in order to enhance the effectiveness of the conference. In some cases, the call may be configured to prohibit, or otherwise limit sharing, in the case of more confidential information.

Figure 10:
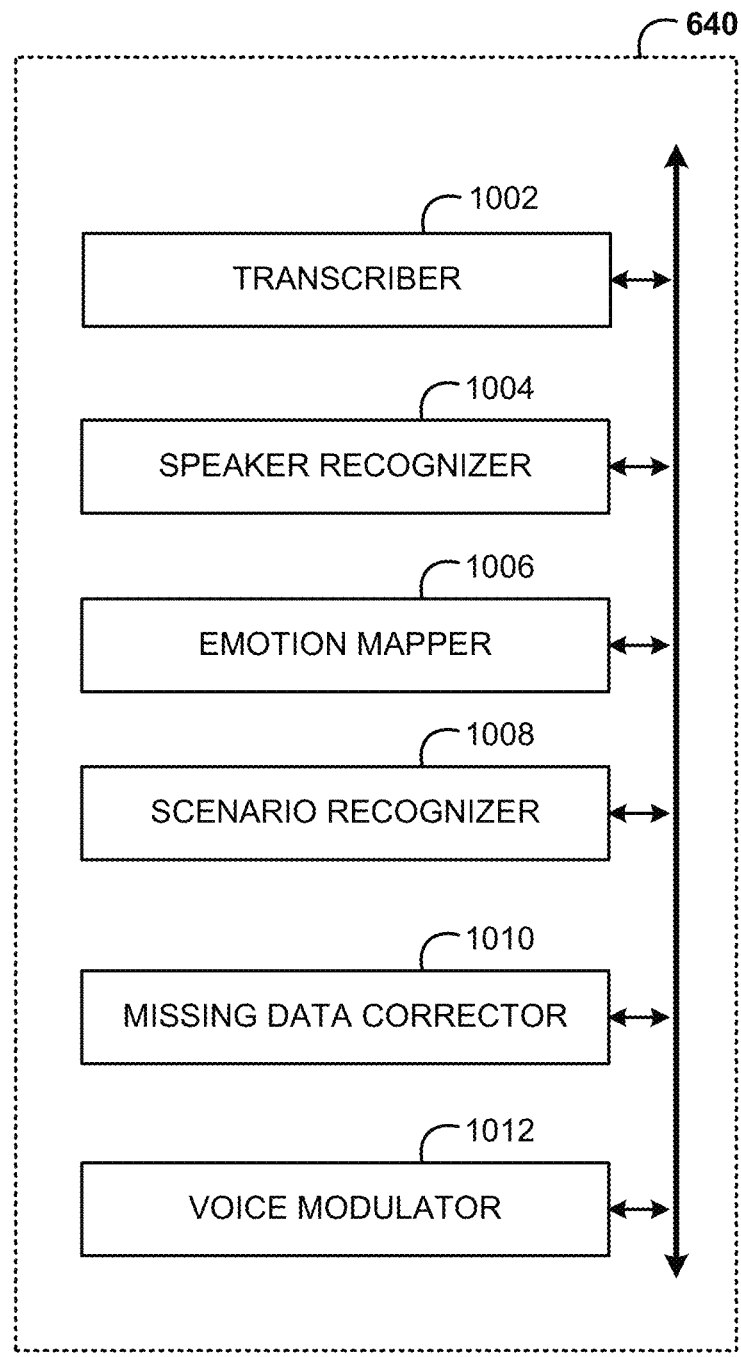
FIG. 10 is an example schematic block diagram for more detailed view of the analysis module of the communication device, in accordance with some embodiments.

FIG. 10 is an example schematic block diagram for more detailed view of the analysis module 640 which provides a number of the analytics that can go into the call summary. For example, a transcriber 1002 may convert the audio data into a written transcript. This transcription may be provided alongside the chronological audio visualization to enable faster and more efficient searching of the conversation.

A speaker recognizer 1004 may differentiate between different speakers, even when the speakers are utilizing a common device. This enables more accurate visualization of the audio, especially when the speakers have been tagged, as disclosed previously.

The emotion mapper 1006 may filter the audio for cues that indicate an emotional state (e.g., higher pitch to indicate nervousness, or increased cadence and amplitude to indicate frustration, etc.). Such emotional states may be indicated next to the speaker, for example with a color coded outline of the speaker at the proper chronological time. Emotional context is a very important element often missing from non-in-person interactions. By providing emotional mapping, this deficiency can be, at least somewhat, mitigated.

A scenario recognizer 1008 can analyze call format and even call content to glean the call's scenario. For example, a presentation has a very distinctive format whereby a single speaker lectures for the majority of the time, typically with questions interspersed or clustered at the end of the call. This pattern can be readily identified and the call labeled accordingly. Likewise, a board meeting also has a defined format whereby a quorum is established, last meeting notes are reviewed, and matters are voted upon. This in turn differs from a conversation, in which the participants take turns speaking without an apparent format. This module may be able to identify any number of such call archetypes. Likewise, very common terms in the call may be determined as the central theme. The call may then be labeled accordingly. For example, the module may determine that a single speaker is responsible for over 80% of the audio, and the term "evolution" is repeated more frequently than two standard deviations of its average occurrence. The system, in this example, may append the call as "A presentation on evolution."

A missing data corrector 1010 may perform the action of re-integrating late data packets, as has been previously discussed. However, in some embodiments, the data corrector may be further configured to fill in missing data with extrapolation. Computers are very good at correcting visual information where small amounts of data are missing by providing transitional visual data. While not perfect, these corrected images are typically significantly better than the image with missing data. The same holds true for audio data. By transcribing the audio, as indicated above, and determining what was being spoken at the point of missing data, a rough approximation of the sound may be injected into the audio file. While this may not sound perfect to a human ear, the slightly distorted audio often is far more understandable than audio that cuts out, or is otherwise corrupted.

Lastly, a voice modulator 1012 may be employed to alter audio tempo, frequency or perform additional analytics in order to make the voice component of the audio easier to hear. In some embodiments this could include the reduction or filtering out of background or artifact noises. Further, accented voices could be altered to reduce the accent, thereby rendering the speaker more understandable.

While all of the above analytics are presented as being employed after the call for the purposes of augmenting the call summary, it could be possible that some or all of these functions be performed on the fly, and therefore be present during the live call. The major hurdle to such an implementation is entirely based upon data availability and processing power. As such, as more processing power becomes available through advances in device technology, or device type, more or less of these analytic processes may be incorporated during the call as opposed to being performed after the fact.

Another important feature of the currently disclosed systems and methods is the ability for the system to operate in unification with other communication platforms. Other call over network systems currently available require all participants involved to have the same application loaded on their respective devices in order to communicate. For example, a Skype user must know another user's ID who also has Skype on their device, send a contact request, and only then can a call be initiated. The presently disclosed systems and methods do away with this requirement.

Rather than employ a separate user ID, the presently disclosed systems and methods may employ an existing phone number unique to the user. A call may be initiated using any phone number. If the recipient has the presently disclosed system loaded onto their device, then the call may operate through the systems and methods as disclosed. However, if the recipient does not have the application, then the call may still be completed. For an audio call, the system would operate like any other voice over IP (VOIP) service. A text message could likewise be provided to the recipient for rapid downloading of the application in order to provide enhanced service, but would not be required to complete the call. If the sender provides a video or a picture via the disclosed system, the recipient without the system installed will instead receive a text message with a hyperlink to the picture or audio message. Again, information on getting the disclosed system would likewise be provided to enable greater functionality.

By providing platform unification in this manner, the system and methods described herein naturally take advantage of viral marketing. More importantly, however, is the added utility provided to users of the system as they are able to still communicate with any other person, even if they don't have the application installed.

Figure 11:
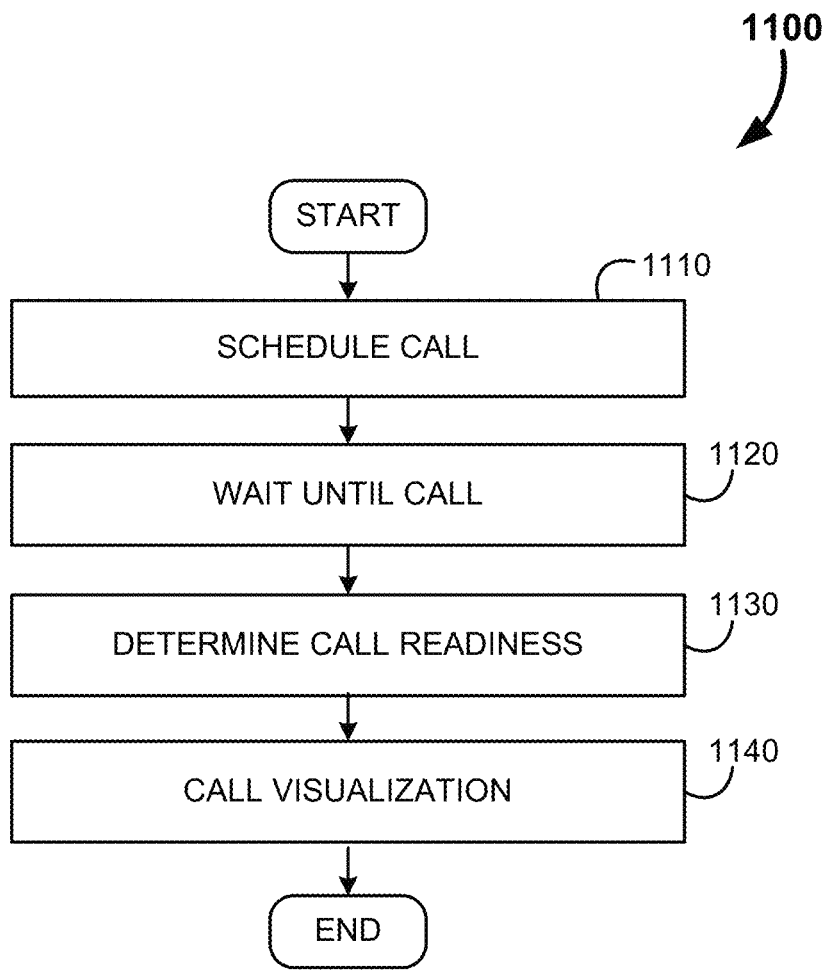
FIG. 11 is an example process flow diagram for visualization of a call over network, in accordance with some embodiments.
Figure 12:
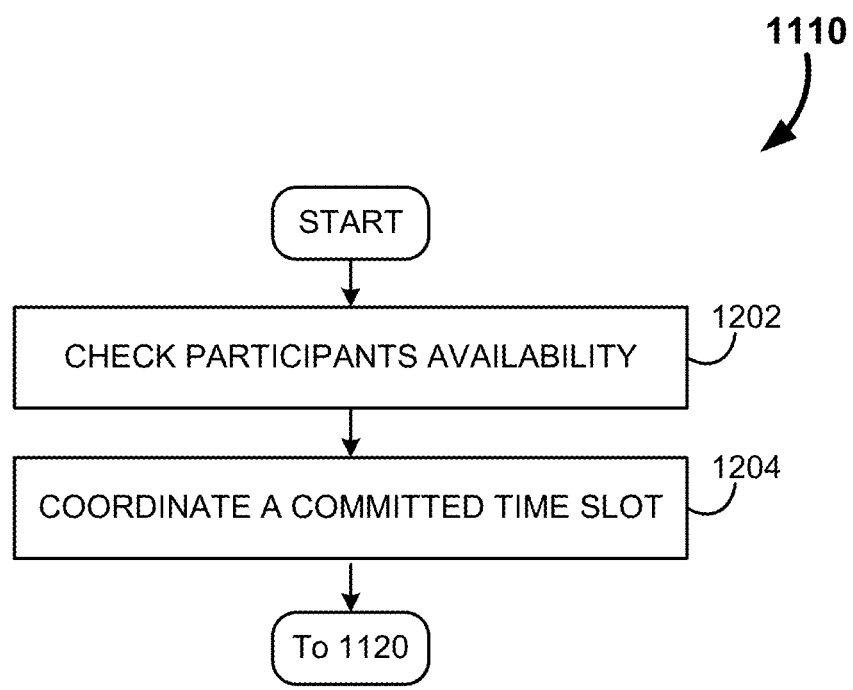
FIG. 12 is an example process flow diagram for call scheduling, in accordance with some embodiments.

Now that the basis systems of visualized call over network have been provided, attention will turn to FIG. 11 which provides an example process flow diagram for visualization of a call over network, shown generally at 1100. This process begins at step 1110, where the call is scheduled. FIG. 12 is a more detailed example process flow diagram for this call scheduling, which comprises the steps of checking participants' availability (at 1202), and coordinating a committed time slot (at 1204). As previously mentioned, this checking of availability may include looking at the calendar on the device and coordinating with other participants' calendars to find a time best suited for the call. The participants may then be provided the ability to provide direct suggestions, and ultimately a time slot is chosen or agreed upon. The time slot may be saved in the device calendar to ensure that the participants are reminded of the event.

Figure 13:
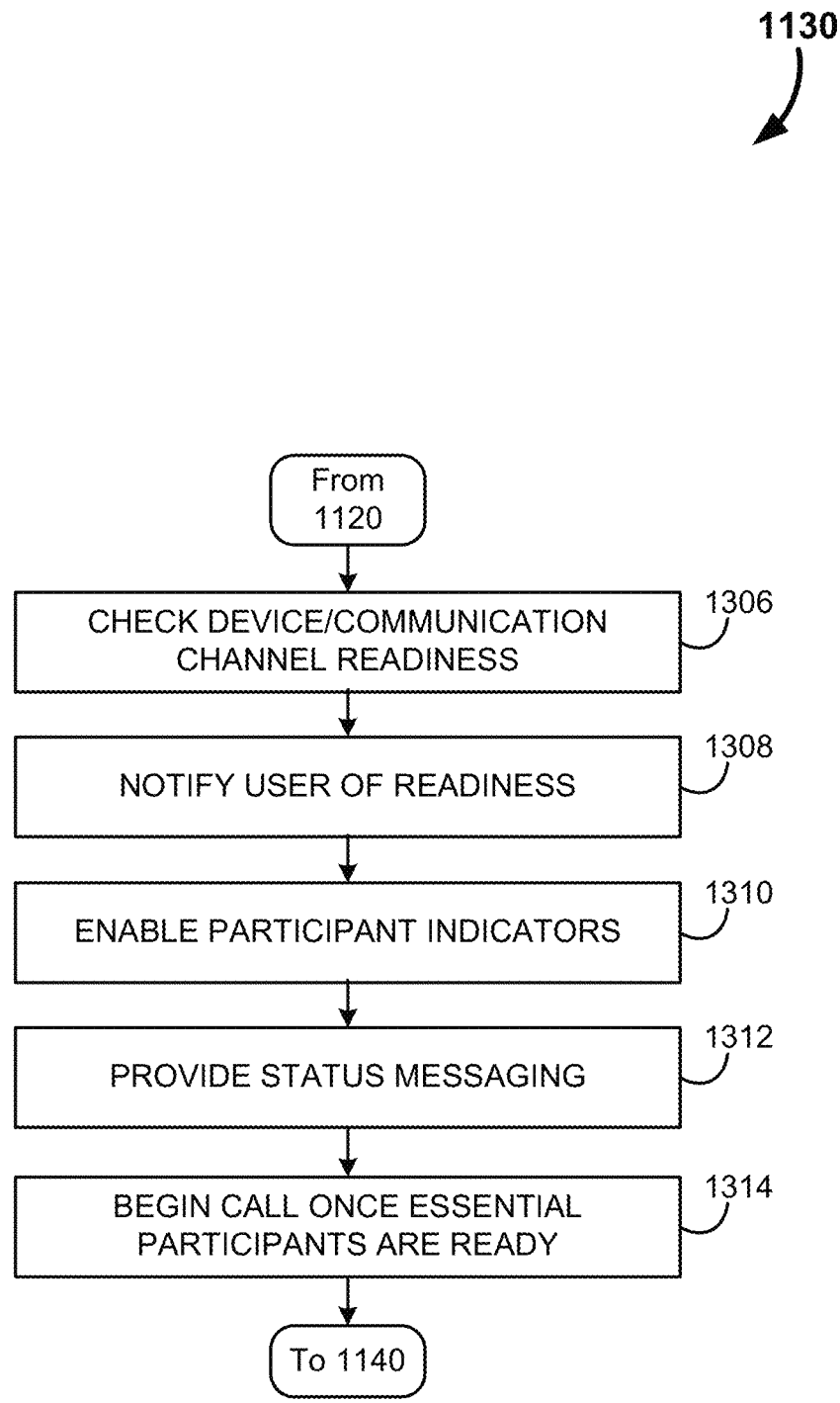
FIG. 13 is an example process flow diagram for determining call readiness, in accordance with some embodiments.

Returning to FIG. 11, after call scheduling, the process remains idle in the interim period until the call draws closer in time (at 1120). Then, as the call approaches, the process may determine call readiness (at 1130) for the device and the participant. FIG. 13 is a more detailed example process flow diagram for determining call readiness. The device is checked for readiness by querying the communication channels (at 1306) to ensure they are operating properly. The participant is also notified (at 1308) of the call, typically via a push notification and the opening of a dialog box. This dialog box form a virtual "pre-call lobby", which enables the participants to communicate and coordinate the call start. The participants are provided the ability to display status indicators (at 1310) and status message (at 1312). These indicators may include visual references to the other participants if they are ready, busy, or running late, for example. The status messaging may include canned messages, or may include customized text, as previously discussed. Once all essential participants indicate that they are ready, the call may begin (at 1314). In alternate circumstances, the participants may force a start even without the full number of essential participants. Likewise, in alternate cases, the call may be delayed even after all essential participants are ready in order to accommodate other non-essential participants.

Figure 14:
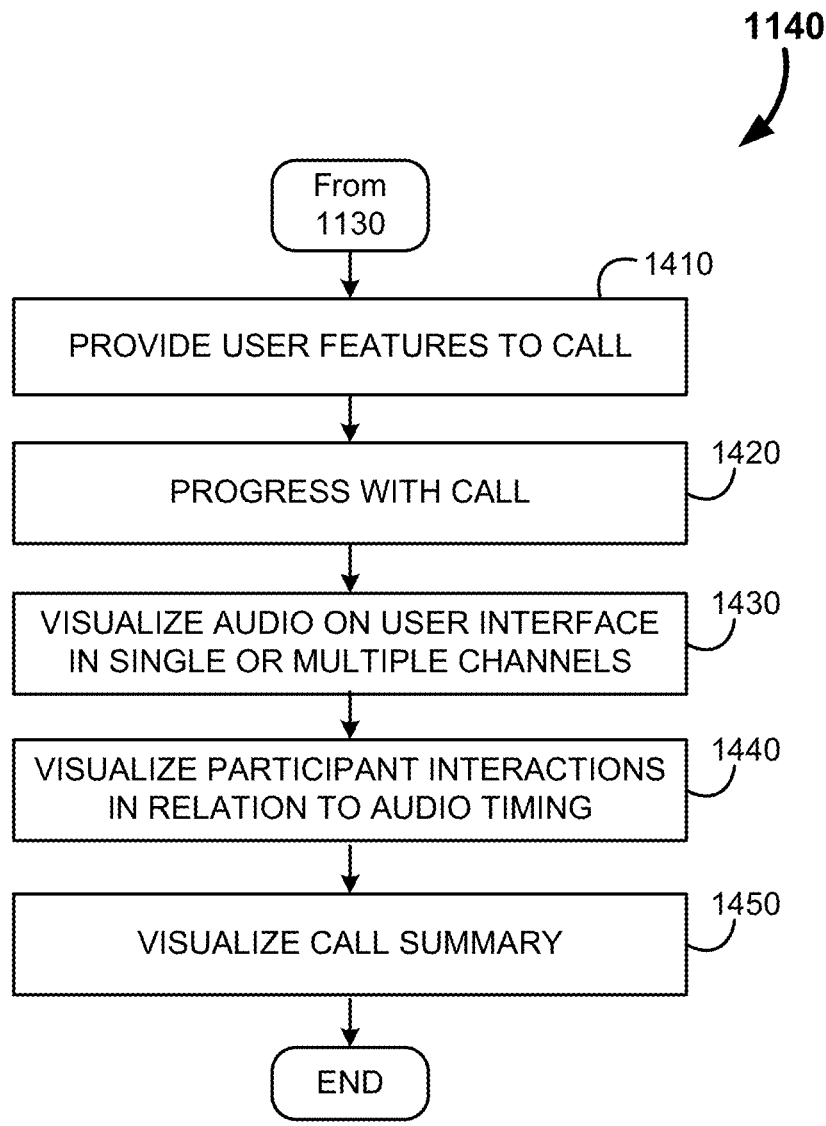
FIG. 14 is an example process flow diagram for call visualization, in accordance with some embodiments.
Figure 15:
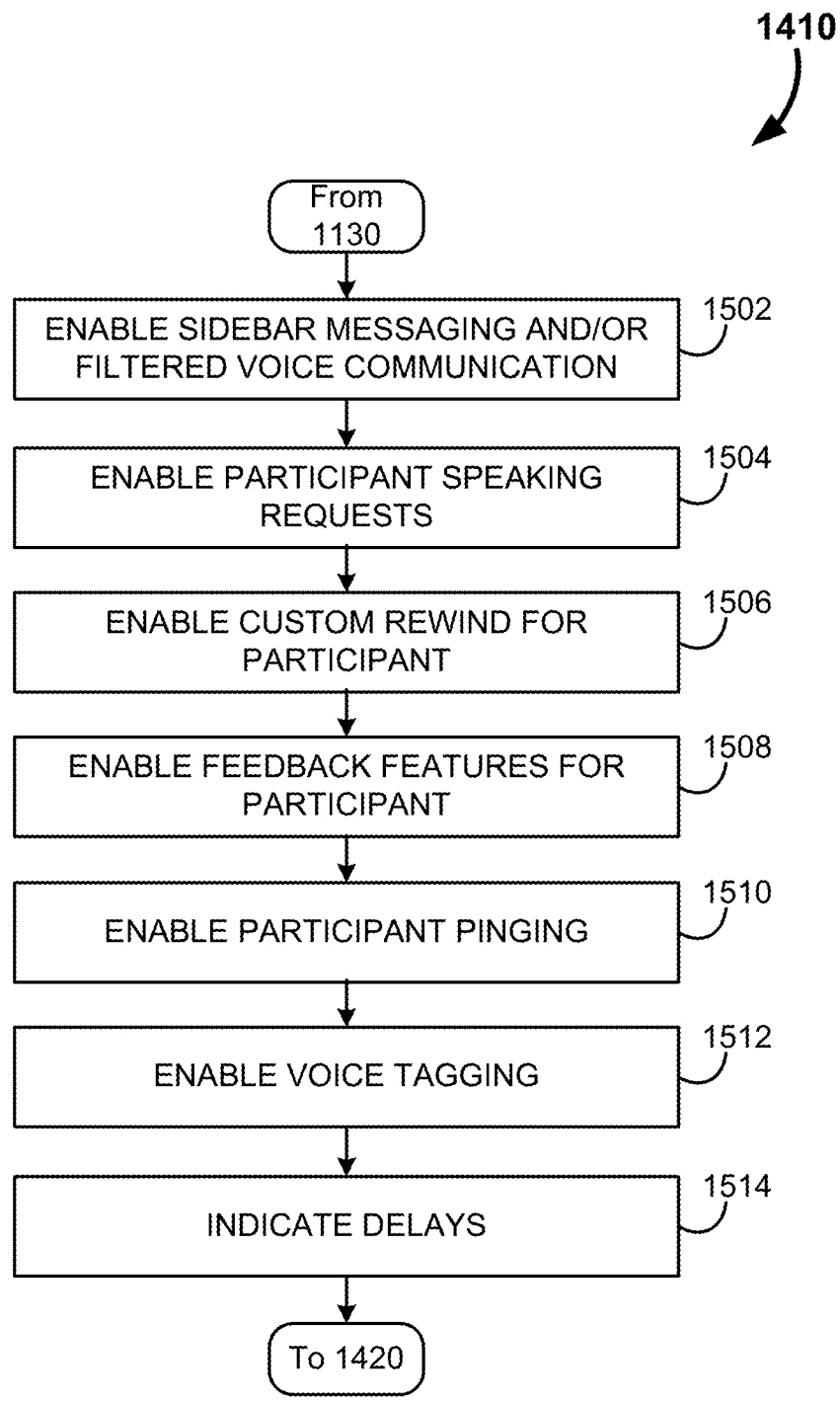
FIG. 15 is an example process flow diagram for providing participant features, in accordance with some embodiments.

Returning to FIG. 11, after call readiness has been determined, the call may be visualized (at 1140). FIG. 14 is a more detailed example process flow diagram for call visualization. In this example, call visualization starts with the participant features being made available to the participants (at 1410). Participant features have been disclosed in considerable detail above, and include functions such as those seen in the process flow of FIG. 15. For example, the participant may be provided the ability to have sidebar messaging and/or filtered audio messaging to a select subgroup of the participants (at 1502). The participants may also be enabled to display a speaking request (at 1504). Participants can have custom rewind enabled (at 1506), and feedback features (at 1508). The participant may have the ability to ping another participant provided (at 1510), and voice tagging functions may be provided (at 1512).

Additionally, at this stage, delays that exceed a configured threshold (800 ms for example) may be indicated to the speaker (at 1514) in order to reduce the chances of people speaking over one another, and to reduce speaker impatience. As previously described, delays may be introduced into a call when network connectivity is sub-optimal in order to ensure a basic call quality level. The delay indication may include playback of the last parts of a speaker's audio synched, with or without an offset, to the timing the other participants receive the audio.

Returning to FIG. 14, now that the features have been provided to the participants, the call may progress (at 1420). The audio from the various participants may be visualized in a single or multiple channels (at 1430) for ease of understanding for the participant. Likewise, all the participants' interactions may be appropriately displayed to each other participant (at 1440). These interactions are displayed in relation to the audio timing to further enhance the contextual environment of the call. Lastly, the call summary may be visualized (at 1450).

Figure 16:
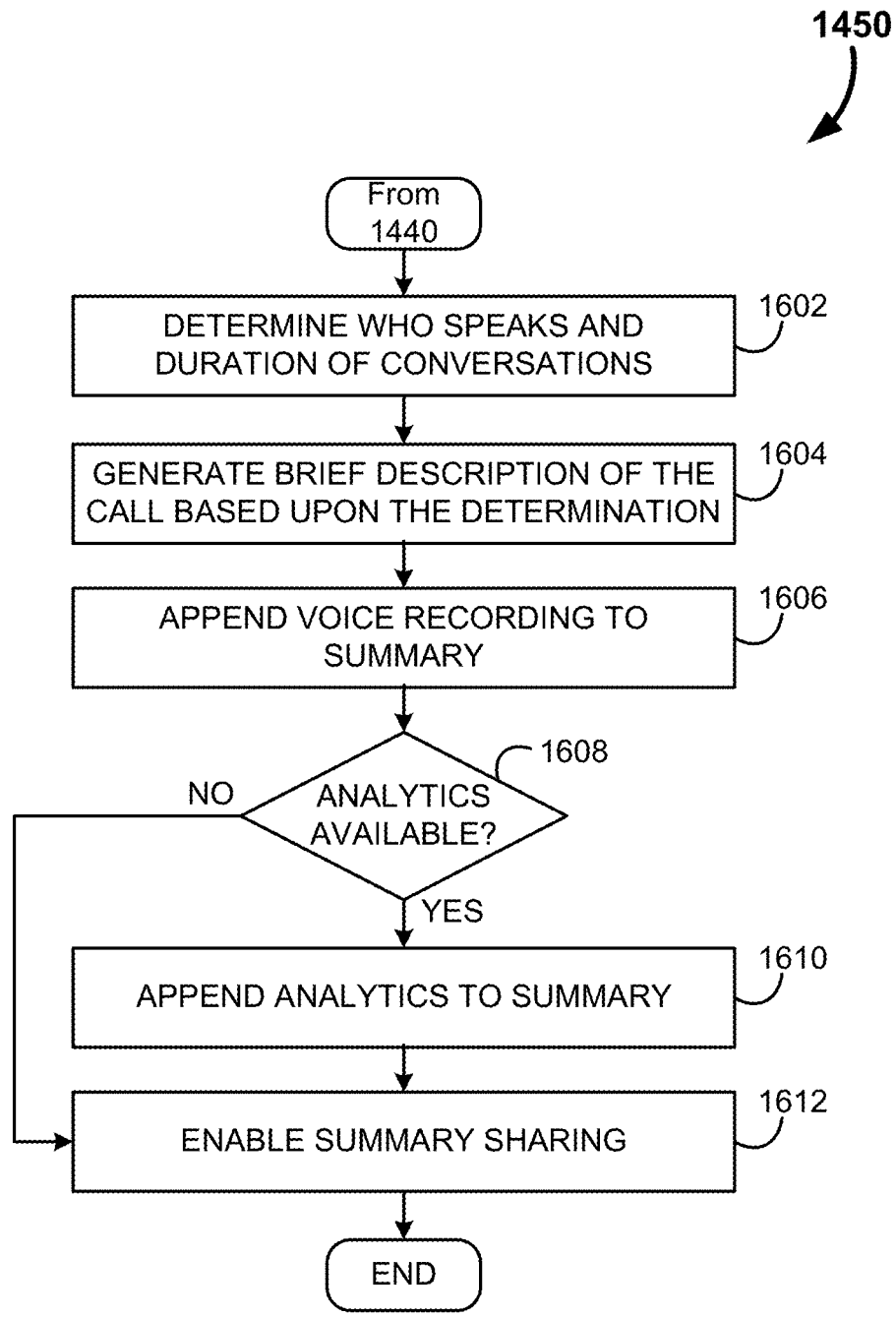
FIG. 16 is an example process flow diagram for visualizing call summary, in accordance with some embodiments.

FIG. 16 is a more detailed example process flow diagram for visualizing call summary. In this sub-process, the system tabulates who spoke on the call, and the duration of each of these speakers (at 1602). A brief description of the call may be generated (at 1604) using this duration information.

The voice recording is then coupled to the summary (at 1606), and a determination may be made whether or not additional analytics are available or desired (at 1610). If analytics are not available, then the call summary is made available for sharing (at 1612) subject to the restrictions previously mentioned.

Figure 17:
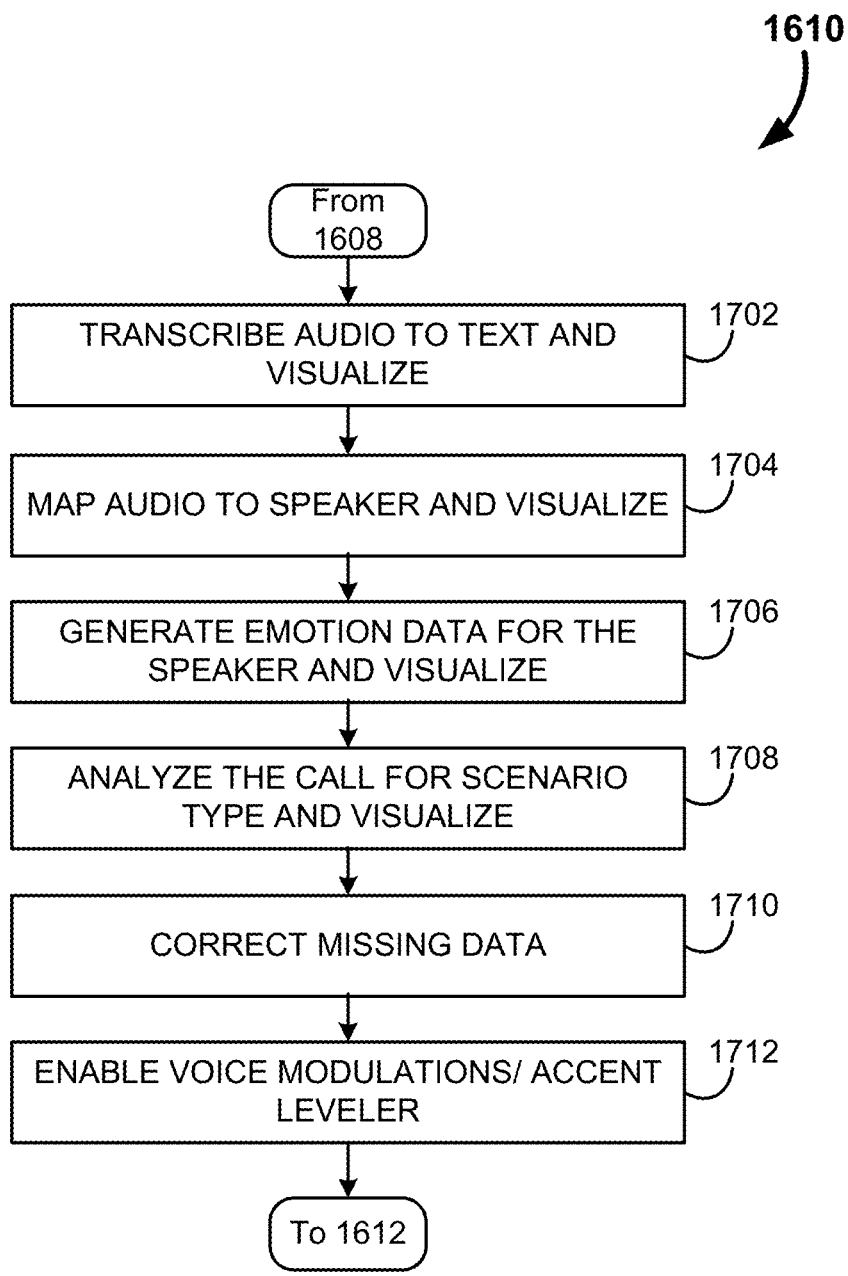
FIG. 17 is an example process flow diagram for visualization of call analytics, in accordance with some embodiments.
Figure 18:
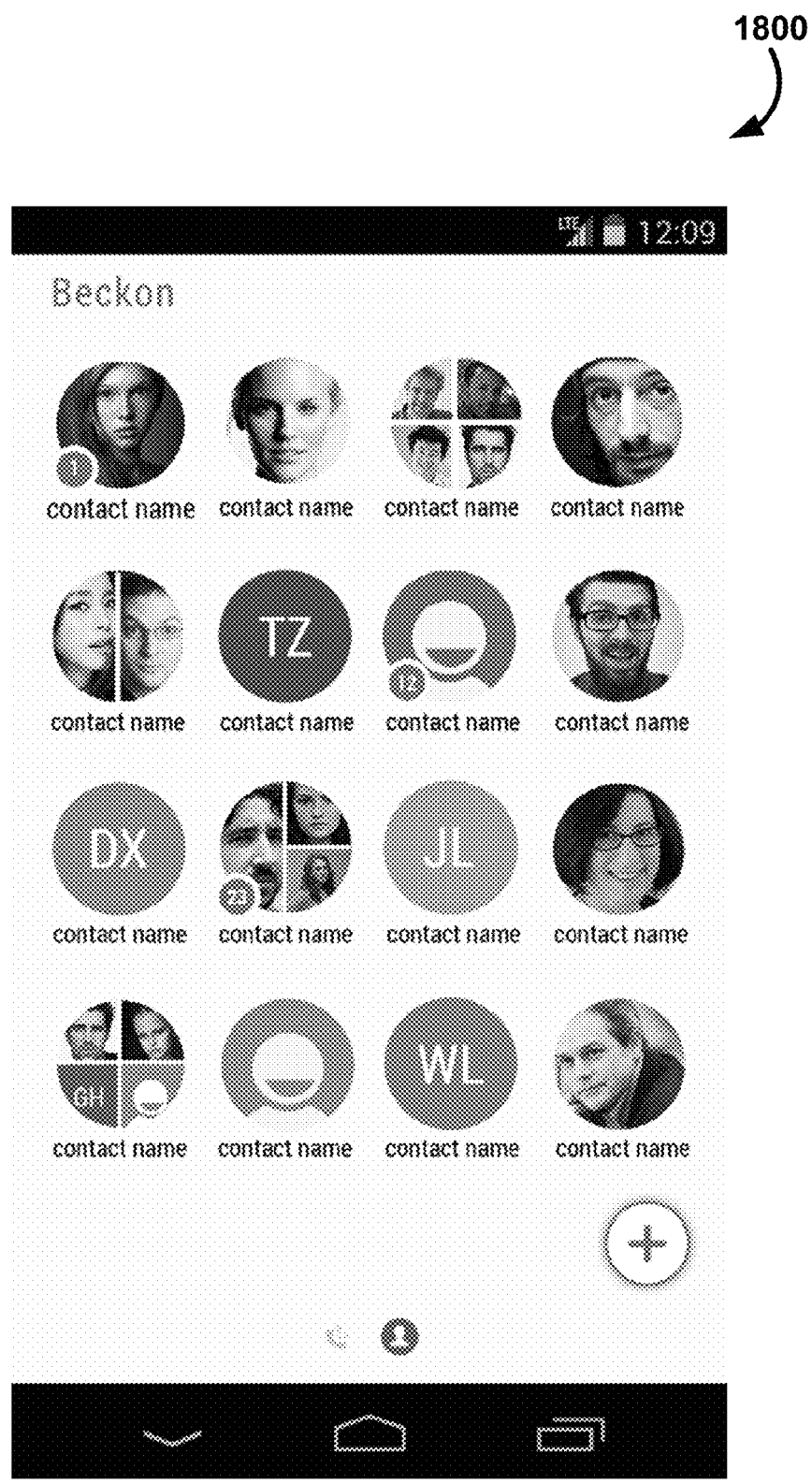
FIG. 18 is an example screenshot for a homepage for a call over network with visualization, in accordance with some embodiments.

However, if additional analytics are in fact wanted, there may be an intervening process whereby the analytics are generated and appended to the summary (at 1610). FIG. 17 is an example process flow diagram for these analytics, which have been previously touched upon. The additional analytics may include transcription of the audio recording to text (at 1702), and visualization of the text in temporal relation to the audio visualization. The audio may be mapped to the speaker (at 1704) and likewise visualized. Emotional data may be generated using audio cues (at 1706), and these emotional states may be displayed in conjunction with the audio visualizations.

The call may be analyzed for the scenario and type (at 1708) and this may be incorporated into the call description. As noted before, who spoke and the duration of the respective speakers can be matched against known scenarios to determine what type of call it was (i.e., lecture, discussion, board meeting, etc.).

Missing or late data may likewise be repaired in the analysis (at 1710). A voice modulator may then make the audio portion of the recording more understandable by reducing background noises and leveling voice fluctuations and perceived accents (at 1712).

As previously noted, any of these analyses may be alternatively performed on the fly to provide these functionalities during the live call. This often depends heavily upon available processing bandwidth, and as such in some cases some of these analyses may be performed after the fact (such as voice accent modulation), whereas other processes (like emotion mapping) may be performed during the call.

II. Examples

Figure 19:
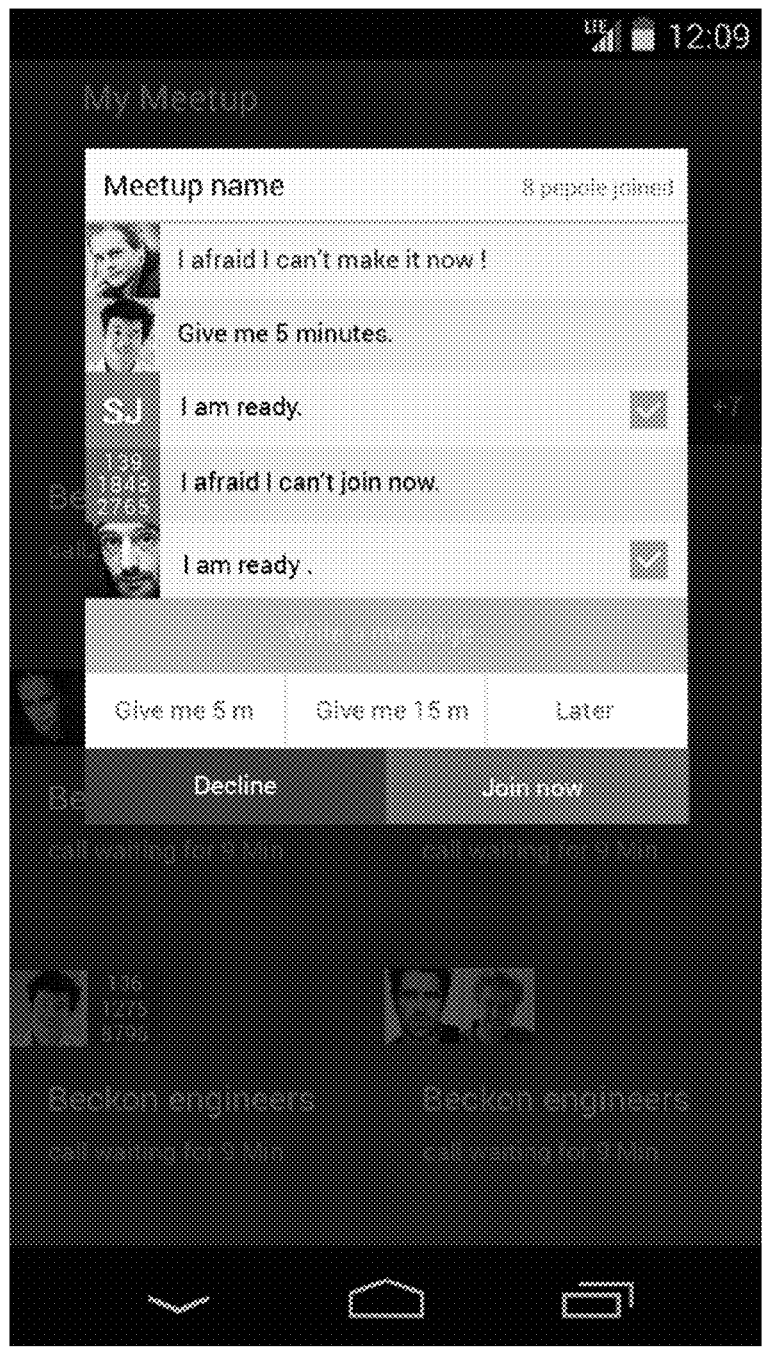
FIG. 19 is an example screenshot for the call scheduling, in accordance with some embodiments.

Now that the systems and methods for visualization of calls over network have been described in considerable detail, a series of example screenshots are provided in reference to FIGS. 18-22 which exemplify the above systems and methods. For example, FIG. 19 provides an example screenshot for a homepage for a call over network with visualization, shown generally at 1800.

In this example screenshot, the contacts for the participant are displayed in a grid. The participant has the option of adding additional contacts (using the plus sign), or may choose to initiate a call. The instant example is clearly optimized for display on a smart phone or tablet display, including a touch screen. Of course these examples are merely intended to provide possible implementations of some of the disclosed systems and methods, and as such, the scope of this disclosure is intended to include interface layouts that are alternatively optimized for other display types, user preferences, etc.

FIG. 19 is an example screenshot for the call scheduling, shown generally at 1900. In this example, a call request has been initiated, and the participant is capable of responding to the request. Other participants' indicators of readiness or inability to join are displayed. The participant has the option of writing a message to be displayed, or selecting one of any number of pre-written messages. Alternatively, the participant can indicate their readiness to join, or decline the call outright.

Figure 20:
FIGS. 20-21 are example screenshots for alternate means of displaying a call progressing with visualization, in accordance with some embodiments.
Figure 21:
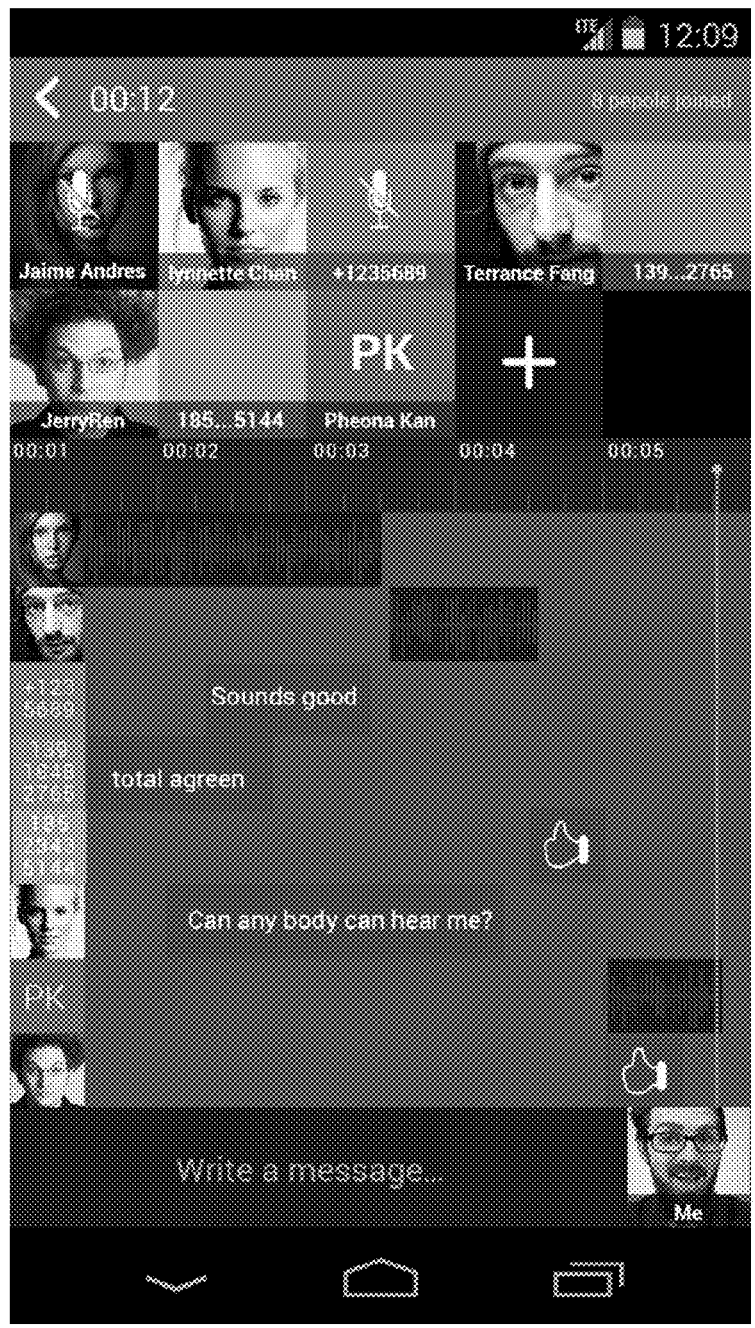

FIGS. 20-21 are example screenshots for alternate means of displaying a call progressing with visualization, in accordance with some embodiments. In FIG. 20, the call is visualized in a single channel, shown at 2000. Each participant is illustrated at the top of the display. Mute, or other features, are displayed for each participant accordingly as an overlay or coloration of the displayed contact. For example, a small hand is illustrated over two of the participants' icons. These "raised hands" indicate that these individuals wish to speak. Below the participant icons is illustrated a chronological timeline of all activity along a single channel. Participant features such as thumbs-up and thumbs down, volume level, and raising a hand are displayed on the right hand side of the interface. Lastly, a messaging box is provided at the bottom of this example display.

In contrast, FIG. 21 illustrates many of the same elements, but differs in that the call is visualized in multiple channels, shown generally at 2100. Rather than a timeline approach running vertically, in this example time scrolls from the left to the right. Each participant is shown as their own channel (labeled on the left hand side). As time progresses the participant actions or audio input is positioned in accordance with the timing. Thus, it can be seen that the first participant begins speaking at the beginning (represented by an audio waveform image). The third and fourth participants have provided texted input in relation to what is being said during this time. Next the second participant starts talking, which apparently the fifth participant agrees with (as indicated by the feedback thumbs-up symbol). The seventh participant has texted a question to the others asking if she can be heard.

Figure 22:
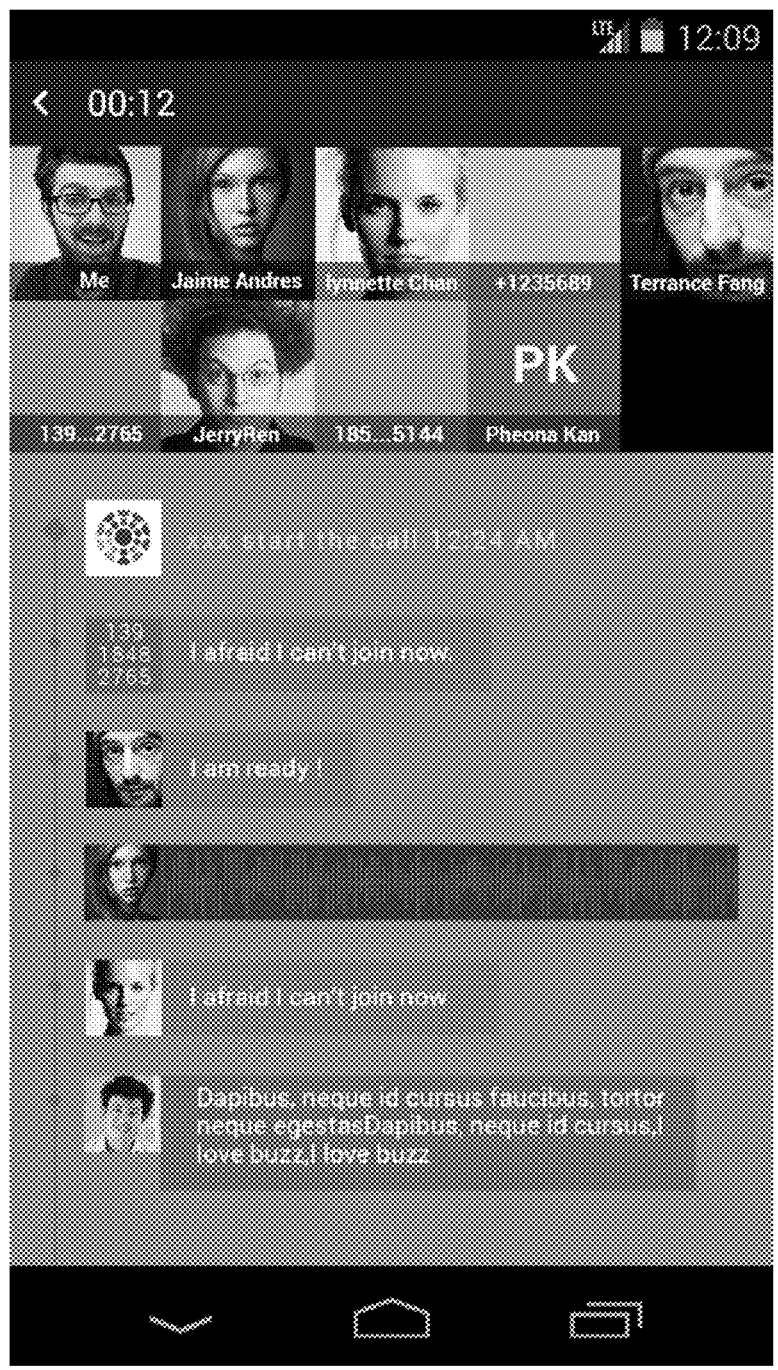
FIG. 22 is an example screenshot for a call summary with visualization, in accordance with some embodiments.

Moving on, FIG. 22 is an example screenshot for a call summary with visualization, shown generally at 2200. Here, all participant interactions and audio segments are compiled into a timeline summary. As noted, additional analysis may be performed on the call recording and likewise included into this summary. Although not illustrated, a participant may now upload or otherwise share the summary with others.

Clearly, such call visualizations are capable of conveying far more information between participants than traditional audio calls are able. This enables more efficient and effective calls over network.

Also clear is that not all functionalities disclosed above have been illustrated in the foregoing examples. This stems from the fact that some features (like a vibration ping, or a pulsing color outline indicating participant emotional state) do not translate well to static figures. However, these figures are again intended to be merely examples, and such omissions are understood to in no way limit the scope of the present invention.

III. System Embodiments

Figure 23A:
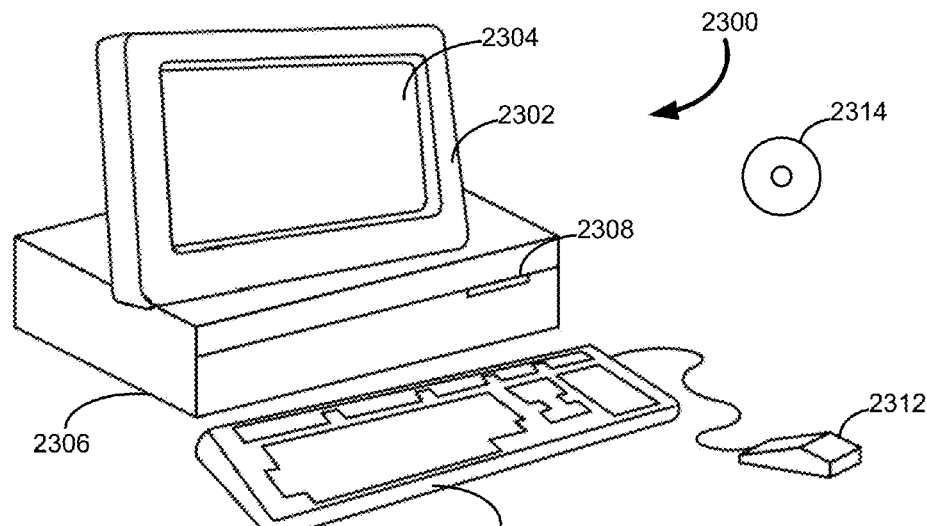
FIGS. 23A-B are example computer systems capable of implementing the system for visualizing a call over network, in accordance with some embodiments.
Figure 23B:
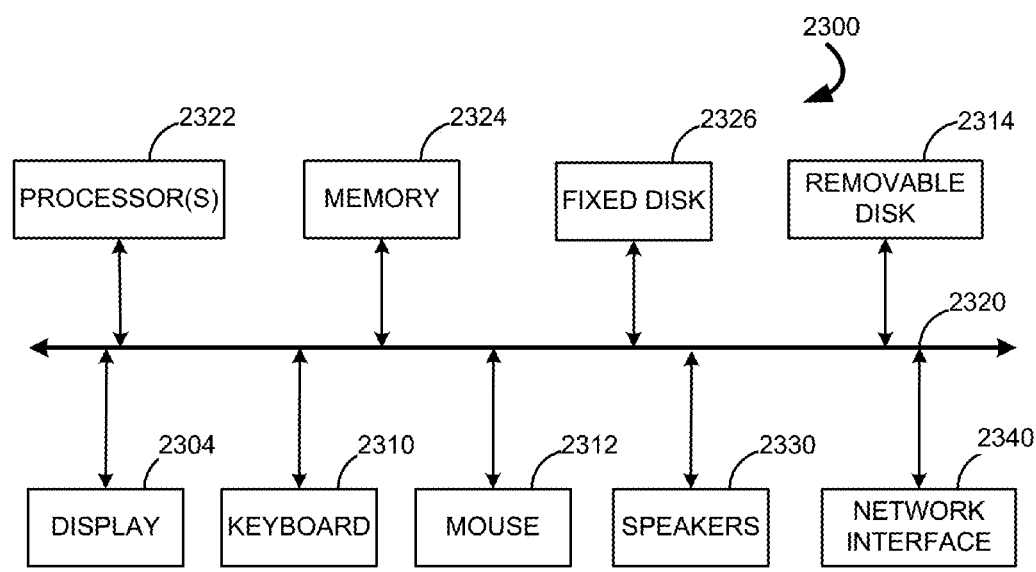

FIGS. 23A and 23B illustrate a Computer System 2300, which is suitable for implementing embodiments of the present invention, including server portions of the call over network. FIG. 23A shows one possible physical form of the Computer System 2300. Of course, the Computer System 2300 may have many physical forms ranging from a printed circuit board, an integrated circuit, and a small handheld device up to a huge super computer. Computer system 2300 may include a Monitor 2302, a Display 2304, a Housing 2306, a Disk Drive 2308, a Keyboard 2310, and a Mouse 2312. Disk 2314 is a computer-readable medium used to transfer data to and from Computer System 2300.

In addition to the standard desktop, or server, computer system illustrated, it is fully within the scope of this disclosure that any computer system capable of the required storage and processing demands would be suitable for embodying the present invention. This may include tablet devices, smart phones, pin pad devices, and any other computer devices, whether mobile or even distributed on a network (i.e., cloud based).

FIG. 23B is an example of a block diagram for Computer System 2300. Attached to System Bus 2320 are a wide variety of subsystems. Processor(s) 2322 (also referred to as central processing units, or CPUs) are coupled to storage devices, including Memory 2324. Memory 2324 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 2326 may also be coupled bi-directionally to the Processor 2322; it provides additional data storage capacity and may also include any of the computer-readable media described below. Fixed Disk 2326 may be used to store programs, data, and the like and is typically a secondary storage medium (such as a hard disk) that is slower than primary storage. It will be appreciated that the information retained within Fixed Disk 2326 may, in appropriate cases, be incorporated in standard fashion as virtual memory in Memory 2324. Removable Disk 2314 may take the form of any of the computer-readable media described below.

Processor 2322 is also coupled to a variety of input/output devices, such as Display 2304, Keyboard 2310, Mouse 2312 and Speakers 2330. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor 2322 optionally may be coupled to another computer or telecommunications network using Network Interface 2340. With such a Network Interface 2340, it is contemplated that the Processor 2322 might receive information from the network, or might output information to the network in the course of performing the above-described visualization of call over network. Furthermore, method embodiments of the present invention may execute solely upon Processor 2322 or may execute over a network such as the Internet in conjunction with a remote CPU that shares a portion of the processing.

In sum, the present disclosure provides systems and methods for visualization of a call over network. Such systems and methods enable clearer and more efficient communications which has distinct value for both businesses and casual users of such communication means.

While this invention has been described in terms of several embodiments, there are alterations, modifications, permutations, and substitute equivalents, which fall within the scope of this invention. It should also be noted that there are many alternative ways of implementing the methods and systems of the present invention. It is therefore intended that the following appended claims be interpreted as including all such alterations, modifications, permutations, and substitute equivalents as fall within the true spirit and scope of the present invention.

What is claimed is:

1. A method for initiating a Call-Over-Network ("CON") conference call, useful in association with a plurality of callers, each of the callers having a communicator, the method comprising:
   prior to a call over network involving a set of callers, each caller having a communicator, querying a microphone channel and a speaker channel on the communicator to determine a device status using a processor of the communicator;
   sending a push notification from a network server to the caller associated with the communicator via the communicator, wherein the push notification alerts the caller of the call, wherein the caller updates a status of the caller in response to the push notification;
   receiving, at the network server, a message from each of the communicators associated with the set of callers identifying a status for each of the set of callers;
   displaying a dialog box on a display of the communicator, wherein the set of callers are listed in the dialog box, wherein the dialog box includes notifications regarding the status of each of the set of callers and the device status for the communicator associated with the caller, wherein the status of each of the set of callers is one of busy, running late, and ready to engage in the call; and
   initiating the call over network, using the communicator, when a subset of callers' status is ready to engage in the call and the device status for the communicator is operational.

2. The method of claim 1, wherein the subset of callers includes all callers.

3. The method of claim 1, wherein the subset of callers includes callers that have been designated as essential participants.

4. The method of claim 1, wherein the subset of callers includes callers that have been indicated readiness prior to a time cutoff.

5. The method of claim 1, wherein the subset of callers includes a threshold number of callers.

6. The method of claim 1, wherein the subset of callers includes callers that have voted to initiate the call over network.

7. The method of claim 1, wherein the notifications include free form text messaging from one caller to other callers.

8. The method of claim 1, wherein the notifications include preconfigured messages sent from one caller to other callers.

9. The method of claim 1, wherein the notifications include information from each caller's calendar.

10. A system for initiating a Call-Over-Network ("CON") conference call, useful in association with a plurality of callers, each of the callers having a communicator, the system comprising:
   a communicator including:
      a channel checker for querying a microphone channel and a speaker channel on the communicator prior to a call over network to determine a device status, wherein the communicator belongs to a caller of a set of callers, wherein each of the set of callers has an associated communicator;
      a processor for sending a push notification to the caller associated with the communicator, wherein the push notification alerts the caller of the call, wherein the caller updates a status of the caller in response to the push notification;

a network interface for receiving a message from each of the communicators associated with the set of callers identifying a status for each of the set of callers; and a display of a dialog box, wherein the set of callers are listed in the dialog box, wherein the dialog box includes notifications regarding the status of each of the set of callers and the device status for the communicator associated with the caller, wherein the status of each of the set of callers is one of busy, running late, and ready to engage in the call; and a call initiator configured to initiate the call over network when a subset of callers' status is ready to engage in the call and the device status for the communicator is operational.

11. The system of claim 10, wherein the subset of callers includes all callers.

12. The system of claim 10, wherein the subset of callers includes callers that have been designated as essential participants.

13. The system of claim 10, wherein the subset of callers includes callers that have been indicated readiness prior to a time cutoff.

14. The system of claim 10, wherein the subset of callers includes a threshold number of callers.

15. The system of claim 10, wherein the subset of callers includes callers that have voted to initiate the call over network.

16. The system of claim 10, wherein the notifications include free form text messaging from one caller to other callers.

17. The system of claim 10, wherein the notifications include preconfigured messages sent from one caller to other callers.

18. The system of claim 10, wherein the notifications include information from each caller's calendar.

* * * * *